(12) United States Patent
Kawai et al.

(10) Patent No.: US 10,755,058 B2
(45) Date of Patent: Aug. 25, 2020

(54) INFORMATION MANAGEMENT SYSTEM, VESSEL, INFORMATION MANAGEMENT METHOD AND OPERATION METHOD

(71) Applicant: OLYMPUS CORPORATION, Hachioji-shi, Tokyo (JP)

(72) Inventors: Sumio Kawai, Hachioji (JP); Wataru Hashimoto, Kawasaki (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 16/182,034

(22) Filed: Nov. 6, 2018

(65) Prior Publication Data

US 2019/0138771 A1 May 9, 2019

(30) Foreign Application Priority Data

Nov. 7, 2017 (JP) ................. 2017-214698

(51) Int. Cl.
*G06K 7/08* (2006.01)
*G06K 7/10* (2006.01)
*G06F 3/01* (2006.01)
*G06T 7/62* (2017.01)
*G06K 9/00* (2006.01)

(52) U.S. Cl.
CPC ......... *G06K 7/10366* (2013.01); *G06F 3/014* (2013.01); *G06K 7/10396* (2013.01); *G06K 9/00624* (2013.01); *G06T 7/62* (2017.01)

(58) Field of Classification Search
CPC ............ G06K 7/00; G06K 7/08; G06K 7/081; G06K 17/0022; G06K 17/0025; G06K 17/0029
USPC ................................ 235/451, 462.46, 472.02
See application file for complete search history.

(56) References Cited

U.S. PATENT DOCUMENTS

| | | | | |
|---|---|---|---|---|
| 2013/0130369 | A1* | 5/2013 | Wilson ................... | G16B 99/00 435/289.1 |
| 2014/0110480 | A1* | 4/2014 | Burri ..................... | G06Q 10/087 235/385 |
| 2015/0289929 | A1* | 10/2015 | Toth ...................... | A61B 18/1492 600/372 |

FOREIGN PATENT DOCUMENTS

JP        2016207013 A        12/2016

* cited by examiner

*Primary Examiner* — Daniel St. Cyr
(74) *Attorney, Agent, or Firm* — Holtz, Holtz & Volek PC

(57) ABSTRACT

An information management system, comprising a first vessel having a first memory that stores first information, a second vessel having a second memory that stores second information, a detection circuit capable of detecting a proximity signal corresponding to approach of the second vessel to the first vessel, and a processor that adds the first information to the second memory that stores the second information, based on the proximity signal that has been detected by the detection circuit.

18 Claims, 18 Drawing Sheets

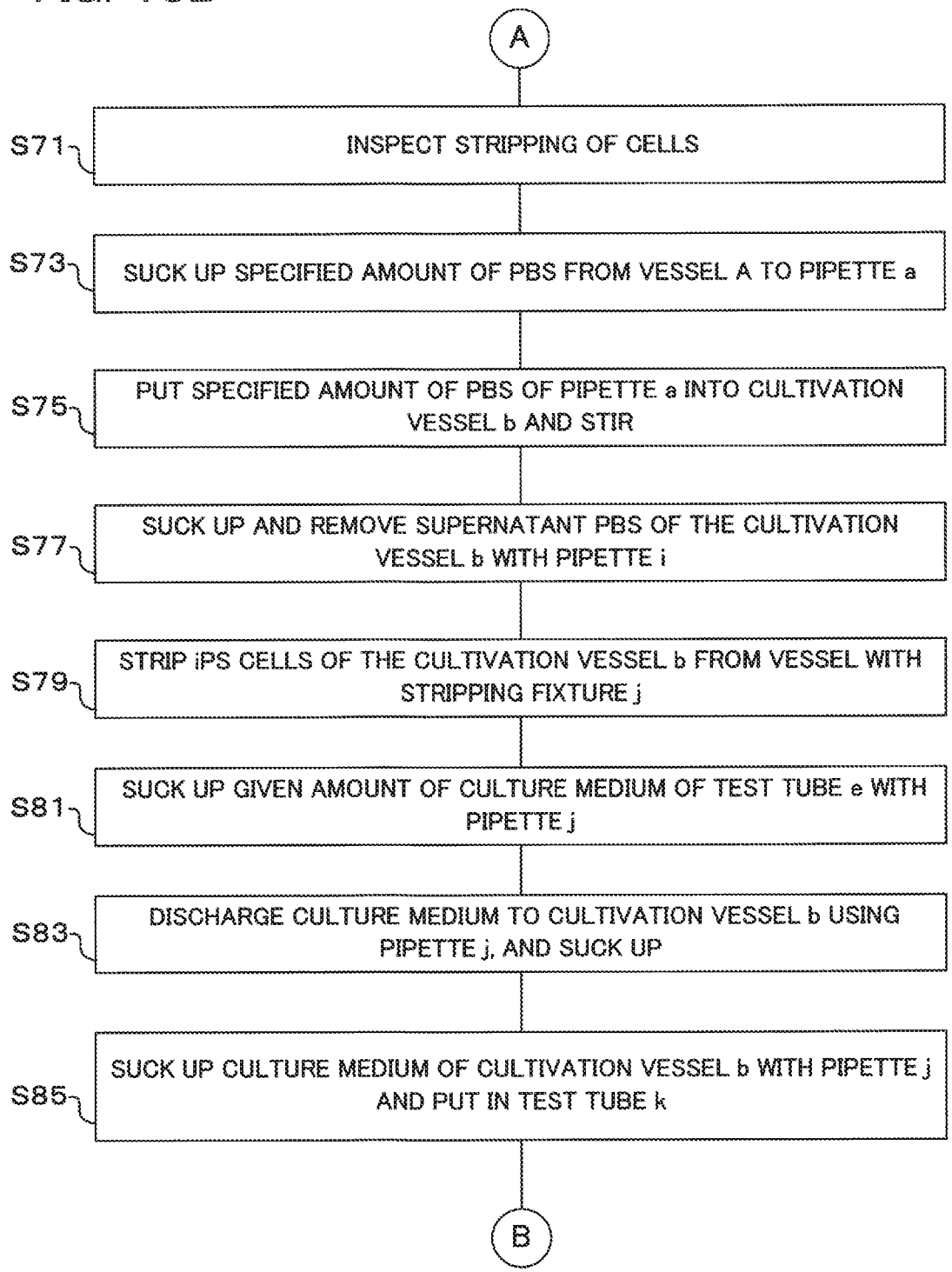

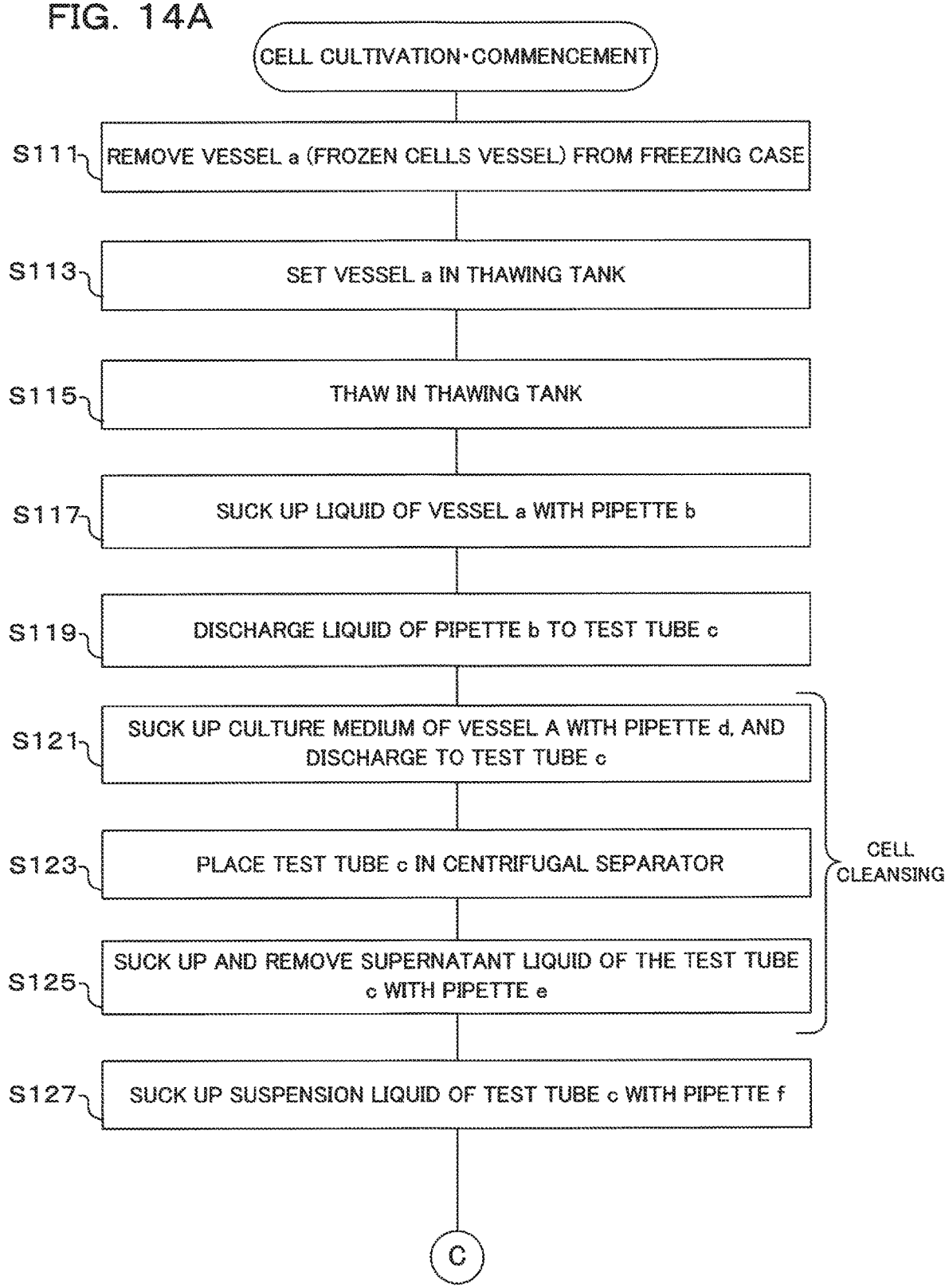

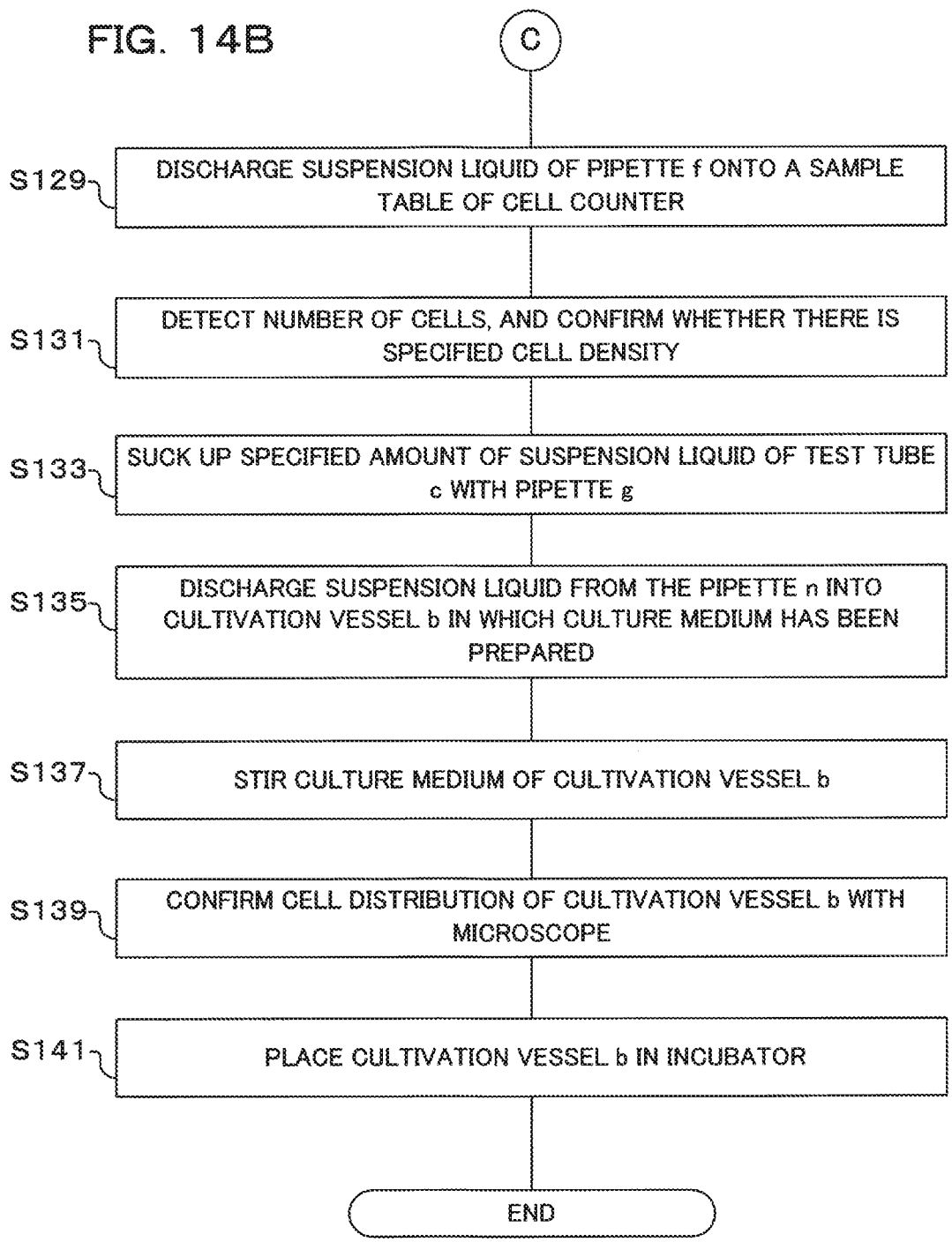

INFORMATION MANAGEMENT SYSTEM, VESSEL, INFORMATION MANAGEMENT METHOD AND OPERATION METHOD

CROSS-REFERENCE TO RELATED APPLICATIONS

Benefit is claimed, under 35 U.S.C. § 119, to the filing date of prior Japanese Patent Application No. 2017-214698 filed on Nov. 7, 2017. This application is expressly incorporated herein by reference. The scope of the present invention is not limited to any requirements of the specific embodiments described in the application.

BACKGROUND OF THE INVENTION

1. Field of the Invention

The present invention relates to an information management system, a vessel, an information management method and an operation method applied to a process that subjects a cell culture or the like to various processing.

2. Description of the Related Art

Specimen containers, culture vessels, automatic management devices and, cell therapy and specimen inspection that use these devices have conventionally been used. With these cell therapy and specimen inspection, it is necessary to ensure identity between cells and tissue that has been gathered from the inside of a subject, and cells and structures that have been actually tested. Also, in a case where treatment is performed to transplant tissue that has been collected and subjected to culture processing to a patient for the purpose of cell therapy, it is necessary to prevent erroneous handling throughout the treatment, including its intermediate stages, in order to ensure reliable traceability.

In order to ensure identity and traceability of cells and tissue there has been proposed an identity security system wherein, at a stage of gathering biomedical tissue from a specimen using a biopsy needle having an IC tag in which identifying information of a specimen is written, and at a transfer stage of accommodating the biomedical tissue that was gathered using the biopsy needle in a vessel for testing and culture vessel cultivation that has been provided with a vessel fitting IC tag together with transferring information of the biopsy needle IC tag to the vessel fitting IC tag, verification of inspection results of biomedical tissue for the specimen is performed using information of the vessel fitting IC tag (refer, for example, to Japanese patent laid-open No. 2016-207013 (hereafter referred to as "patent publication 1")).

The identity security system disclosed in patent publication 1 has management of information for only simple operations such as inspection, but has no description regarding information management in the case of complex operations such as cell cultivation. Also, it is not possible to prevent mistakes at the time of writing specimen identification information. Also, in patent publication 1, if information is to be written for complex operations, it would be necessary to inspect a specimen beforehand. Further, with patent publication 1 no consideration has been given to information that is generated by operations, and operation information is not received, and there is no description regarding abnormal gathering of a specimen or receiving of information for leaving a specimen after having been gathered etc.

SUMMARY OF THE INVENTION

The present invention provides an information management system that precisely manages various information such as contents information, process information etc. in a system for cell cultivation etc. that performs complex process operations, and a vessel, an information management method and an operation method that are suitable for this information management system.

An information management system of a first aspect of the present invention comprises a first vessel having a first memory that stores first information, a second vessel having a second memory that stores second information, a detection circuit capable of detecting a proximity signal corresponding to approach of the second vessel to the first vessel, and a processor that adds the first information to the second memory that stores the second information, based on the proximity signal that has been detected by the detection circuit.

An information management system of a second aspect of the present invention comprises a first vessel having a first memory, a second vessel having a second memory, a detection circuit that detects an operation signal corresponding to operation for the first and second vessel, and a processor that reads out first history information that was stored in the first memory at the time the detection circuit detected the operation signal, adds this first history information to information relating to the second vessel and/or information relating to the operation in the second memory, and rewrites history information that has been stored in the second memory.

An information management system of a third aspect of the present invention comprises a station, having a first vessel having a first communication circuit, a second vessel having a second communication circuit and a memory, and a communication circuit capable of communication with the first and second communication circuits, and capable of detecting proximity signals corresponding to approach of the first and second vessels, and a processor that is arranged in the station, acquires information on the first vessel by detecting approach of the first vessel using the first communication circuit, sends information on the first vessel by means of the second communication circuit by detecting approach of the second vessel, and stores the information on the first vessel in the memory.

A vessel of a fourth aspect of the present invention has a station, a communication circuit for performing communication, and a memory, the vessel comprising, when the communication circuit has communicated with the station, having the memory acquire information that was received immediately before by the station, and adding this information to the memory.

An information management method of a fifth aspect of the present invention is an information management method for an information management device that comprises a first vessel having first information and a second vessel having second information, the management method comprising detecting whether or not the first and second vessels have approached, and when the first and second vessels have approached adding the first information to the second information.

An operation method for an information management device of a sixth aspect of the present invention is an information management method that is capable of communicating with a first memory and a second memory, the information management method comprising steps of detecting approach of the first to the memory information management device at a first time, detecting approach of the second memory to the information management device at a second time that is continuous to the first time, and making a period from the second time to a third time that is continuous to the second time an enable period in which it is possible to add information that has been stored in the first memory to the second memory.

A processor of a seventh aspect of the present invention is a processor that is capable of communicating with a first vessel having a first memory that stores first information, a second vessel having a second memory that stores second information, and a detection circuit that is capable of detecting proximity signals corresponding to approach of the first and second vessels, wherein the processor adds the first information to the second memory that stores the second information, based on the proximity signals that have been detected by the detection circuit.

BRIEF DESCRIPTION OF THE DRAWINGS

FIG. 13A to FIG. 13C are flowcharts showing a subcultivation operation in an information management system of one embodiment of the present invention.

FIG. 14A and FIG. 14B are flowcharts showing a cell cultivation operation in an information management system of one embodiment of the present invention.

DETAILED DESCRIPTION OF THE PREFERRED EMBODIMENTS

As one embodiment of the present invention, an information management system used when performing processing for cell cultivation etc. will be described in the following as an example. It should be noted that in this specification content information indicates general information on biological matter such as cells, bacteria, viruses etc. Additive information indicates information on chemical agents that have been added to contents. Vessel information indicates information on bottles, tubes, pipettes etc. that contents and additives are put into. Operation information indicates information relating to operations such as delivery that are performed for contents, additives, and vessels, and to moving, heating and sterilization etc. Also, information about a person subjected to collection is stored in clothing such as a bracelet that is worn by an operator, for example, the person subjected to collection (or thing subjected to collection). An IC chip in which information on the person performing collection is written may be embedded in the person performing collection (or thing subjected to collection).

Figure 1:
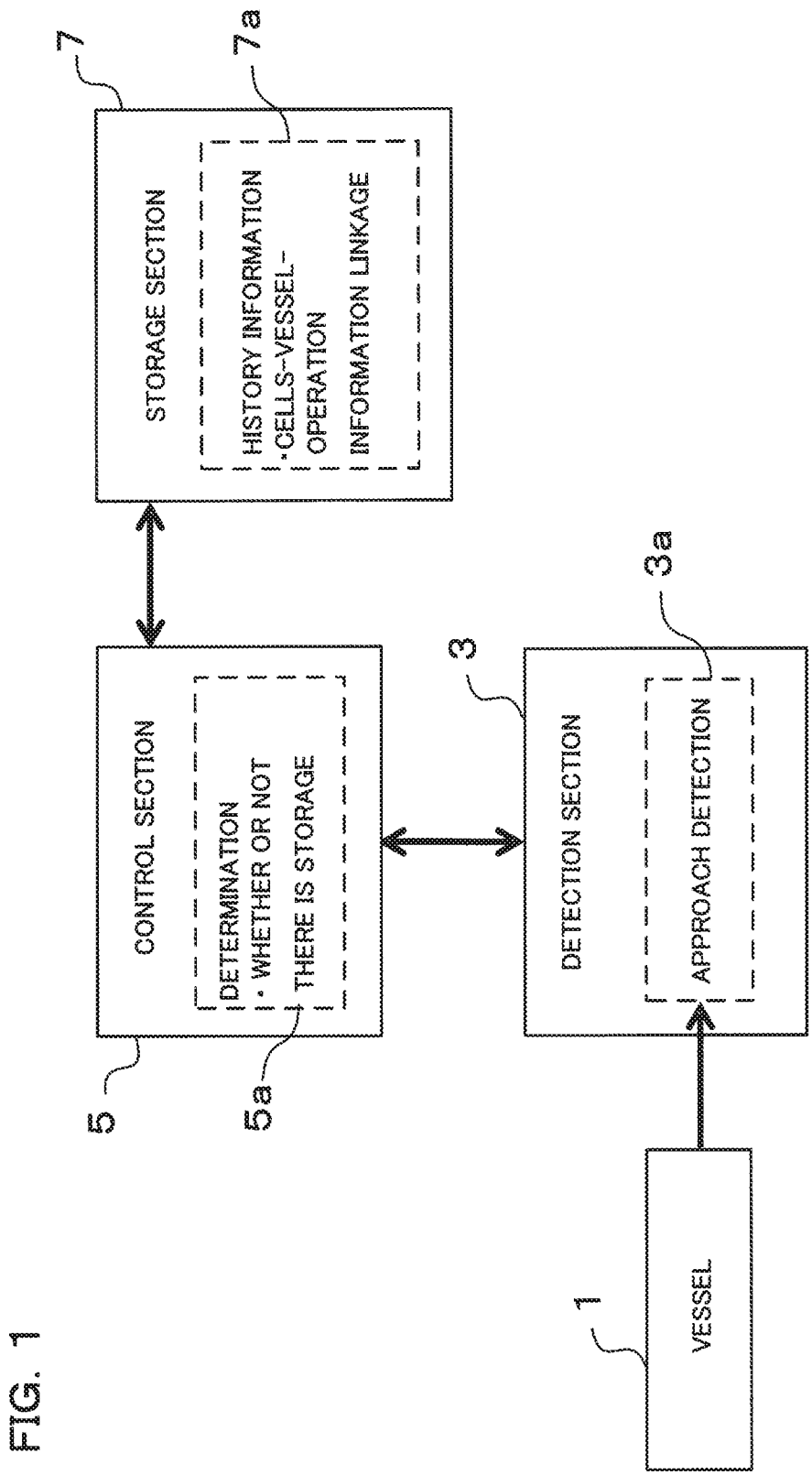
FIG. 1 is a block diagram for describing an overview of an information management system of one embodiment of the present invention.

FIG. 1 is a block diagram that shows an overview of an information management system of one embodiment of the present invention as a first embodiment. In FIG. 1, the vessel 1 is a culture vessel in which cells etc. are cultivated, a bottle, tube or pipette etc. that can hold operating fixtures, additives, and content, or any equipment that is used with these processes. The detection section 3 is provided on the vessel 1, an operator of cell cultivation etc., in operating tools for processing, or in a processing table for processing etc., and has a sensor for detecting approach of the vessel 1. The detection section 3 should be capable of detecting approach of at least two vessels. The detection section 3 may be attached directly to a vessel, but this is not limiting. The detection section 3 outputs information to a control section 5 if it is detected that the vessel 1 has been approached (approach detection 3a).

The control section 5 is a processor having a computer processing device such as a CPU (Central Processing Unit), and may perform control in accordance with a program, and may also be a processor that performs digital signal processing. The control section 5 performs determination as to whether or not information is stored within the vessel 1 based on approach information from the detection section 3, and controls writing of history information to a storage section 7.

The storage section 7 is a non-volatile electrically rewritable memory, and performs rewriting of history information by the control section 5. Specifically, the control section 5 stores information that associates cell information and vessel information that has been stored up to now as history information (history information 7a). It should be noted that history information is not limited to cell information, and may also be information that has been associated with contents.

The detection section 3, control section 5 and storage section 7 may be provided inside the same device or vessel, and three, or two, may be provided inside separate devices or vessels. When provided inside separate devices or vessels, communication may be performed wirelessly (including infra-red etc.)

With this embodiment, as will be described in detail later, processing such as cell cultivation is performed using various vessels and tools, and since at the time of moving cells during a cultivation stage approaching the vessel will occur, every time cells are moved that movement is detected by the detection section 3 and history information is stored in the storage section 7. Accordingly, it is possible to trace movement of cells by referencing the history information.

It should be noted that with this embodiment, as will be described later, an information processing device etc. is provided in individual vessels etc., and history information is written to a storage section within this information processing device etc. Specifically, a storage section 7 is provided in different vessels to the vessel and information on contents that have been moved from the vessel 1, to a different vessel is added. However, this is not limiting, and a server that presides over the entire processing system may be provided, and this history information stored. Storage sections in which history information is written may also be provided within rooms and buildings where processing is carried out.

Figure 2:
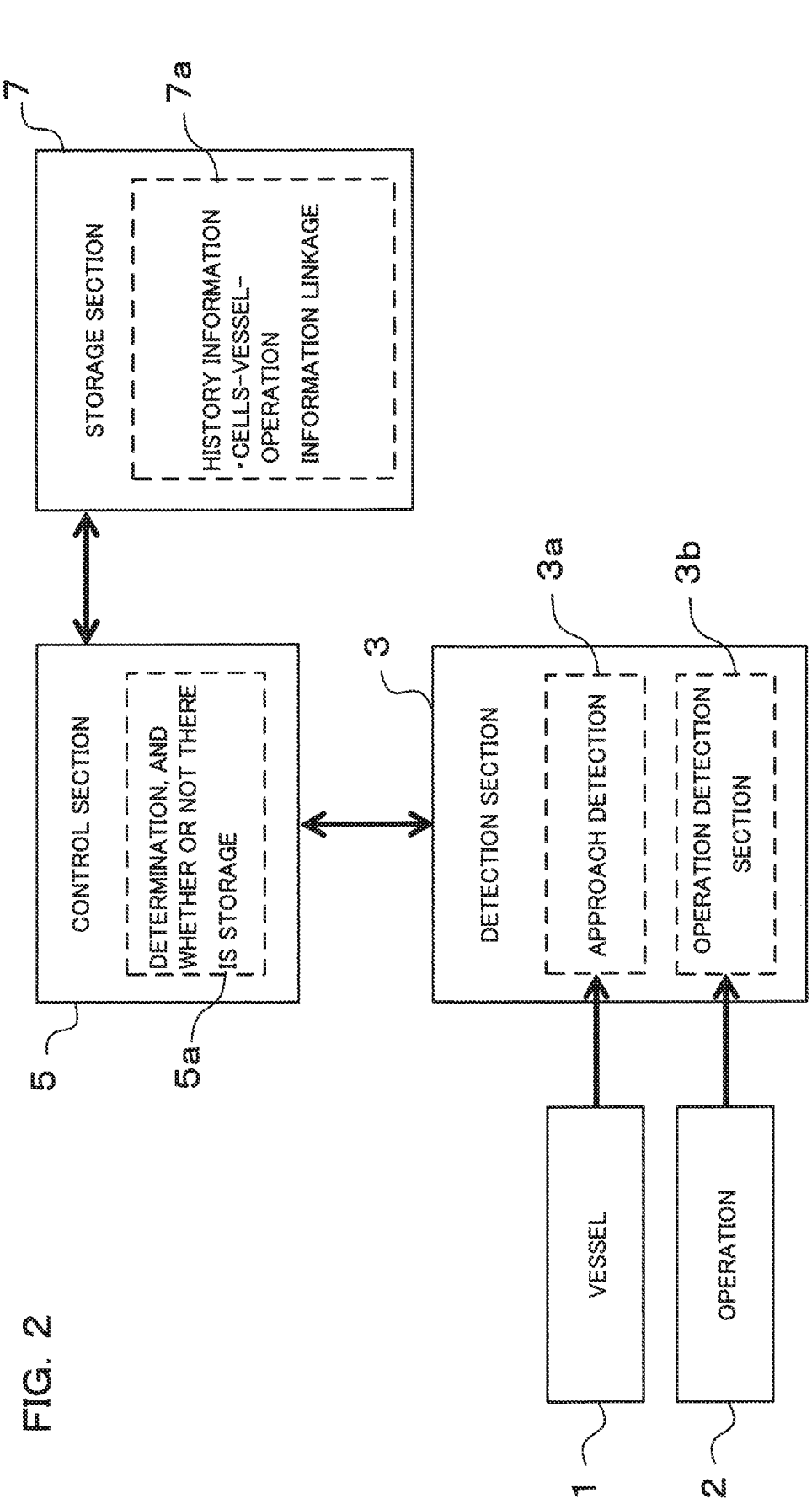
FIG. 2 is a block diagram for describing an overview of a first modified example of an information management system of one embodiment of the present invention.

FIG. 2 is a block diagram that shows an overview of an information management system of one embodiment of the present invention as a second aspect. Compared to the information management system that was shown in FIG. 1, an operation 2 has been added, and the fact that the detection section 3 performs detection 3*b* is different, while remaining structure is the same as in FIG. 1.

The detection section 3 detects operation content of the operation 2 (operation detection 3*b*), and outputs the result of this detection to the control section 5. Also, the storage section 7 stores cells-vessel-operation information linkages as history information. Accordingly, with the information management system of FIG. 2, in addition to approach of the vessel 1 that holds cells that was shown in FIG. 1 (culture vessel, operating tools etc.), the control section 5 performs association of cell information, vessel information and operation information based on operation 2 that was performed on the vessel 1. Also, the control section 5 performs association of vessel information that has been held up to now and operation information that has been performed up to now, and stores in the storage section 7 as history information 7*a*. As a result, it is possible to trace movements of cells and operations that have been performed, during a cultivation process, by referencing the history information. If the above described operation information is stored in a vessel storage section, it is possible to trace as far as operation localized operation history simply by reading the storage section of a specific vessel. Operation information may also be included in vessel information.

Figure 3:
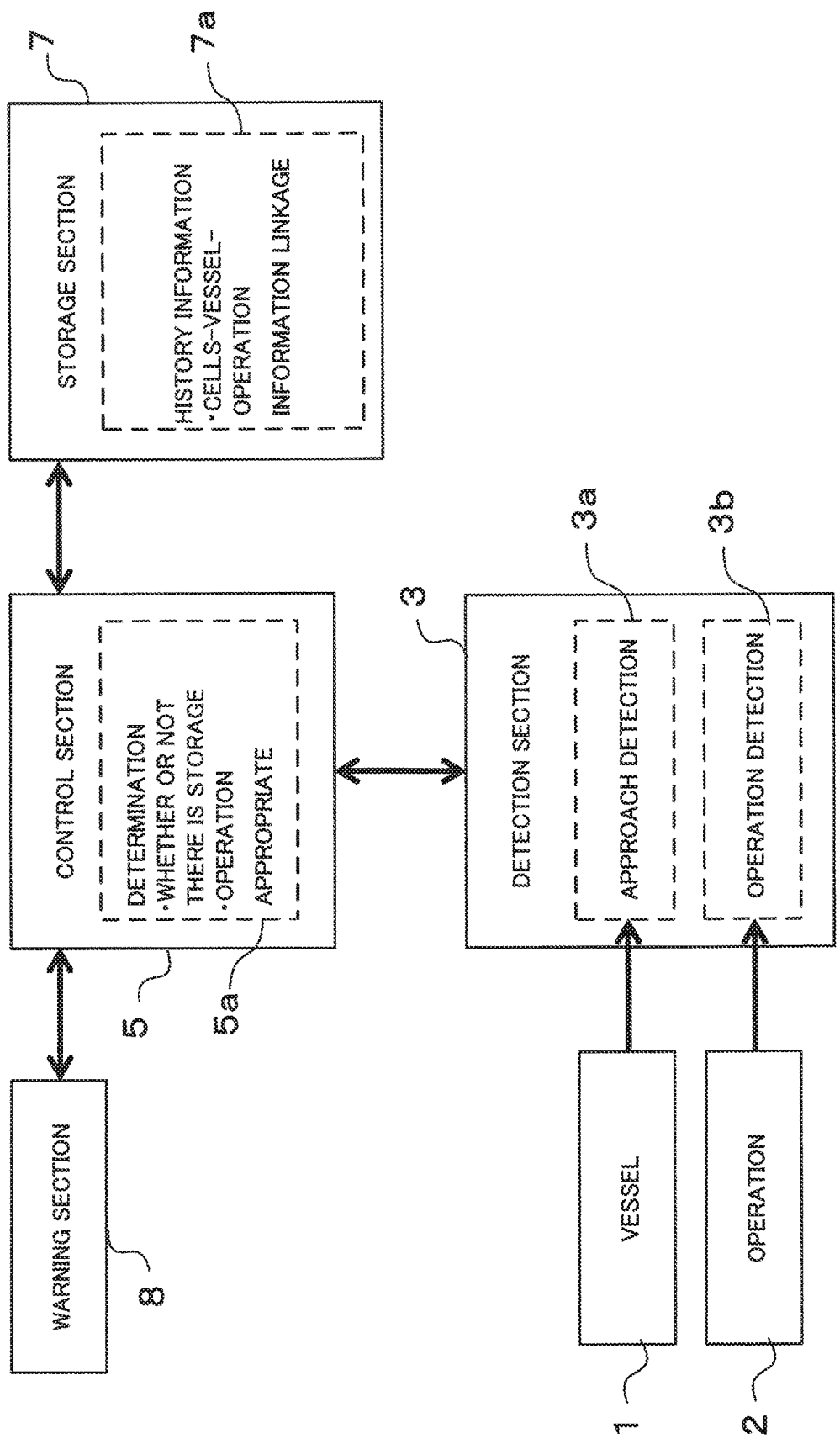
FIG. 3 is a block diagram for describing an overview of a second modified example of an information management system of one embodiment of the present invention.

FIG. 3 is a block diagram that shows an overview of an information management system of one embodiment of the present invention as a third aspect. Compared to the information management system that was shown in FIG. 2, the fact that a warning section 8 is added is different, but the remaining structure is the same as in FIG. 2. The warning section 8 warns the operator of inappropriate processing and operations being performed using vision, hearing, sense of touch etc.

In the example shown in FIG. 3, approach of a vessel (culture vessel, operating tool etc.) and operations performed in a vessel are detected. Also, the control section 5 determines whether or not the vessel 1 and/or operation 2 is appropriate based on history information (cell information and previous vessel information, and operation information) 7*a* from the storage section 7. The warning section 8 generates a warning in an inappropriate case based on the result of determination. It should be noted that as warnings it is possible to advise against use of an inappropriate vessel or to reject cells that have been subjected to inappropriate processing and operations. Using this warning section 8 it is possible to prevent erroneous operation. The warning section 8 functions as a warning device that detects whether or not first and second vessels are appropriate based on history information that has been generated by the processor (storage control section) using at least first information and second information, and performs warning in the event that the result of determination is inappropriate.

Figure 4A:
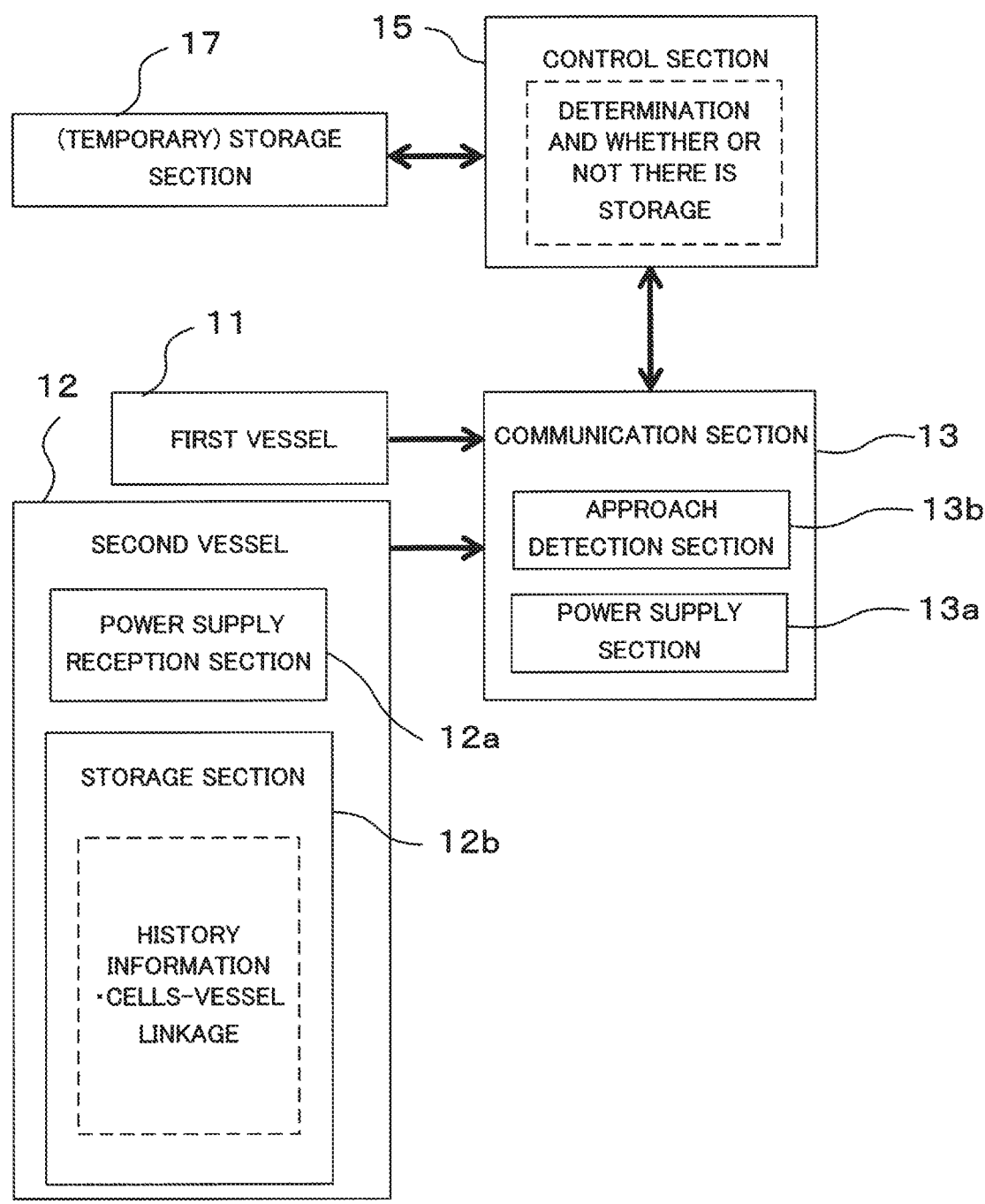
FIG. 4A is a block diagram showing a specific structure of the information management system of one embodiment of the present invention.
Figure 4B:
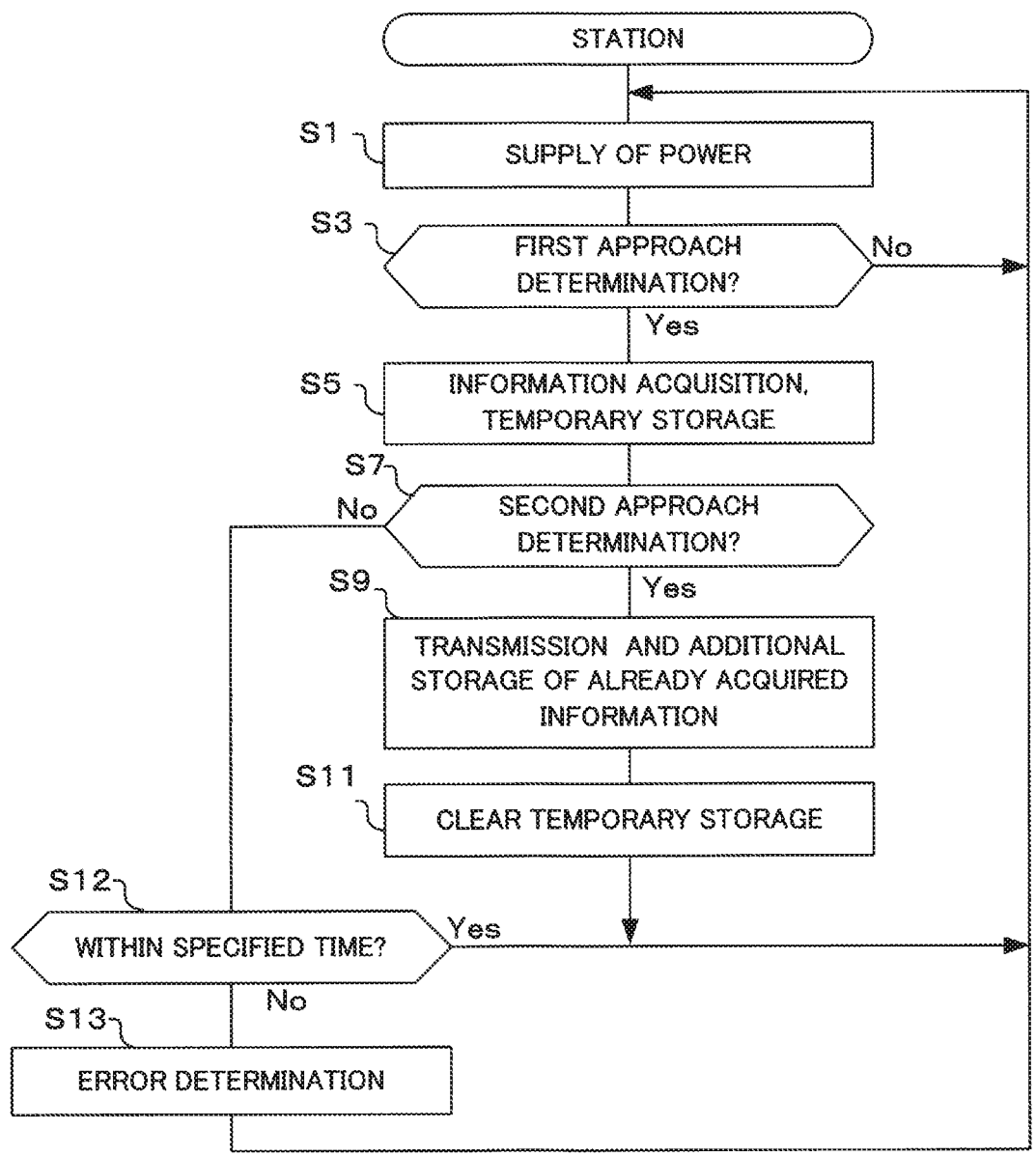
FIG. 4B is a flowchart showing operation of an information management system of one embodiment of the present invention.

Next, schematic structure and operation of the information management system of one embodiment of the present invention will be described using FIG. 4A and FIG. 4B. FIG. 4A is a block diagram mainly showing the electrical structure of the information management system, and FIG. 4B is a flowchart showing operation of the information management system.

A first vessel 11 is a vessel that holds cells, but is not limited to holding cells and may also be a vessel holding contents or additives. Further, the first vessel 11 may be an operating tool. The second vessel 12 is a vessel that is capable of holding contents such as cells, or additive, or an operating fixture for operations.

A power supply reception section 12*a* and a storage section 12*b* are provided inside the second vessel 12. The storage section 12*b* has electrically rewritable non-volatile memory, and history information, namely information showing linkage between cells and vessels is stored in the storage section 12. The power supply reception section 12*a* supplies electrical power for reading out history information that has been stored in the storage section 12, and writing history information. The power supply reception section 12*a* receives electrical waves from an IC tag or the like and generates electrical power based on the electrical waves, but a power supply battery may also be built in. The second vessel 12 also has a communication section for performing communication with a communication section 13.

It should be noted that similarly to the second vessel 12, there are also a power supply receiving section, storage section and communication section inside the first vessel 11, and history information is also stored in the first vessel 11. The system is configured so that it is possible to transmit at least content information such as cells inside the first vessel, and information relating to the vessel, to the communication section 13. The first vessel 11 functions as a first vessel that has a first memory for storing first information. Also, the second vessel 12 functions as a second vessel that has a second memory for storing second information. The first information and second information are at least one from among content information of the first and second vessels, vessel information, and additive information. The above described contents information is information expressing information on operation content and increase and decrease in contents at the time of operation. For example, contents information may be information such as that contents have reduced or increased due to a pipette having been inserted, or has become lost as a result of having been tilted, or has increased by being poured from above. Also, in this case an image may be show increase and decrease of contents, as information representing increase and decrease of contents, or information may be attached to an image using a tag.

The first vessel 11 functions as a first vessel having a first memory (storage section). Also, the second vessel 12 functions as a second vessel having a second memory (storage section). The first vessel 11 functions as a first vessel having a first communication circuit (communication section). The first vessel 11 functions as a first vessel having a first communication circuit (communication section). The first vessel 11 and the second vessel 12 function as a vessel having a communication circuit (communication section) for communicating with a station such as an operating table or wearable terminal, and a memory (storage section). This vessel has memory that acquires and adds information that has been received by the station immediately before, when the communication circuit (communication section) has communicated with the station (refer, for example, to S5 and S9 in FIG. 4B). The station has a detection circuit that is capable of detecting approach of the first and second vessels (refer to the approach detection section 13b, for example), and when approach of the first and second vessels has been detected by this detection circuit (refer, for example, to S3 and S7 in FIG. 3) information that has been received by the station immediately prior is acquired and added into memory (refer to S9 in FIG. 4B, for example). The station has a detection circuit that detects operation for a vessel, and when an operation has been detected by the detection circuit the operation is acquired and added into memory (refer to FIG. 2).

The communication section 13 has a communication circuit that uses wireless (including infra-red etc.), a power supply section 13a and an approach detection section 13b. The approach detection section 13b has a detection circuit (this also includes a case where detection is performed by a CPU), and detects approach of the first vessel 11 and the second vessel 12 based on communication results from the communication circuit. However, this is not limiting and the communication section 13 may have a sensor, and may detect that the first vessel 11 and the second vessel 12 have approached. For example, it may be made possible to generate magnetism, an electric field or light etc. in the vessel, and it may be possible to detect approach of the vessel by a sensor within the communication section 13 detecting the magnetism, electric field or light etc. Also, the approach detection section 13b may detect approach of the first vessel 11 and the second vessel 12 based on image data from a camera that has an imaging section.

The approach detection section 13b functions as a detection circuit that is capable of detecting a proximity signal corresponding to the approach of the first and second vessels (refer, for example, to S3 and S7 in FIG. 4). This detection circuit (approach detection section) detects a proximity signal based on an image that has been acquired by the image sensor. The approach detection section 13b also functions as a detection circuit that detects an operation signal corresponding to an operation for at least one of the first and second vessels (refer, for example, to S3 and S7 in FIG. 4B, and the signal processing/control section 10 etc. in FIG. 5). The operation signal described above corresponds to an operation of having moved the contents of the first vessel to the second vessel. For example, there are operations such as inclining the first vessel above the second vessel, and operation to detect movement of contents using an image, and an operation handled by the same person holding both the first vessel and the second vessel etc. The approach detection section 13b functions as a detection circuit (detection section) that detects a proximity signal corresponding to approach of the first and second vessels, or an operation signal corresponding to the first and second vessels. The communication section 13 is capable of communication with the first and second communication circuits, and functions as a communication circuit (communication section) that is capable of detecting a proximity signal corresponding to approach of the first and second vessels. The communication section 13 functions as a communication circuit of transmitting and receiving to and from the first memory and the second memory.

The power supply section 13a supplies power to the approach detection section 13b (including a communication circuit) and to the power supply reception section 12a etc. Electrical waves are projected to the power supply reception section 12a, and the power supply reception section 12a supplies power based on electrical waves that have been received.

The control section 5 is a processor having a computer processing device such as a CPU (Central Processing Unit), and may perform control in accordance with a program, and may also be a processor that performs digital signal processing. The control section 15 performs determination of cell information within the vessel and sell information, for the first vessel 11 and the second vessel 12, based on approach information from the communication section 13, performs association between the two items of information, and further performs control as to whether or not there is storage of information in the storage section 17, and writing to the storage section 17. The storage section 17 temporarily stores information that has been read out from the first vessel 11 until it is added in the storage section 12b of the second vessel 12. It should be noted that the control section 15, communication section 13 and storage section 17 may be integrally constructed, or some sections may be constructed separately. Further, the first and second vessels 11 and 12 may incorporate some or all of the functions of the control section 15, communication section 13 and storage section 17, and may perform exchange of information directly and perform addition of history information etc. if the first and second vessels 11 and 12 approach.

The control section 15 functions as a processor (storage control section) that adds first information to the second memory that stores second information, based on a proximity signal detected by the detection circuit (approach detection section). Also, when an operation signal has been received by a second detection circuit, the processor (storage control section) adds operation information relating to an operation to the second memory. The control section 15 functions as a processor that rewrites history information that has been stored in the second memory (storage section) by reading out first history information that has been stored in the first memory (storage section) based on an operation signal that has been detected by the detection circuit (detection section), and adding the first history information to information relating to the second vessel and/or information relating to an operation. The control section 15 functions as a processor that, when a proximity signal has been detected by the detection circuit, adds first information to the second memory that stores second information, by means of the communication circuit (refer to FIG. 1 and to S9 in FIG. 4B). The control section 15 functions as a processor that, when an operation signal has been detected by the detection circuit, adds second information to the second memory that stores second information, by means of the communication circuit (refer to FIG. 2).

Next, operation of a specific information management system of one embodiment of the present invention will be described using the flowchart shown in FIG. 4B. This flow is executed by a processor such as a CPU within the control section 15, in accordance with a program that has been stored in memory within the control section 15.

If the flow shown in FIG. 4B is commenced, supply of power is first performed (S1). Here, a power supply section 13a within the communication section 13 supplies power to the power supply reception section 12a within the second vessel 12.

Once power has been supplied, next first approach determination is performed (S3). Here, the approach detection section 13b within the communication section 13 determines whether or not the first vessel 11 and the second vessel 12 have approached. For example, there may be cases where the operator moves contents such as cells that are held within the first vessel 11 to the second vessel 12. At this time, the first and second vessels 11 and 12 receive electrical waves from the power supply section 13a, and transmit electrical waves to the communication section 13. The approach detection section 13b can detect approach of the first and second vessels 11 and 12 based on these electrical signals. Detecting this approach is not limited to the first and second vessels 11 and 12 approaching the communication section 13 at the same time, and there may also be cases where either one approaches before the other. In this case, the approach detection section 13b detects a positional relationship between the two vessels 11 and 12, and it is only necessary to determine that the two vessels have approached at the point in time when they have approached. It should be noted that in step S3 determination is not limited to whether or not the two vessels have approached, and determination may also be operational content at the time of a suction operation etc. If the result of determination in step S3 is that first approach is not detected, processing returns to step S1 and supply of power continues.

If the result of determination in step S3 is that first approach has been detected, information that has been acquired and the time at which the information was acquired are acquired, and temporary storage is performed (S5). In the event that first approach, namely that the first vessel 11 and the second vessel 12 have approached, has been detected, the communication section 13 acquires history information and information relating to the first vessel from the storage section within the first vessel 11, and transmits this information to the control section 15. As information, there is, for example, cell information of cells that have been removed from the first vessel 11, and information such as vessel information of the first vessel 11. The control section 15 temporarily stores information that is been acquired by means of the communication section 13 in the storage section 17.

If information acquisition and temporary storage have been performed in step S5, next second approach determination is performed (S7). Here, whether or not the first vessel 11 and the second vessel 12 have approached is determined by image recognition, based on image data that has been acquired by the imaging section of a camera within the approach detection section 13b. For example, in a case where cells within the first vessel 11 have been moved to the second vessel, the control section 15 analyzes image data and performs determination based on change in a positional relationship between the two vessels etc. Operation determination may also be performed here by analyzing image data.

If the result of determination in step S7 is that the first and second vessels have approached, information that has already been acquired is transmitted to the control section 15, and added in the storage section 17 (S9). Since the result of determination in step S3 and S5 is that the first vessel 11 has approached the second vessel 12, it is determined that content such as cells have been moved from the first vessel 11 to the second vessel 12, and information that has been acquired, such as history information relating to the first vessel 11 that is temporarily stored in the storage section 17, is transmitted to the second vessel 12 and stored in the storage section 12b. The transmission of information here will be described later using FIG. 5 to FIG. 7.

Clearing of temporary storage is then performed (S11) Since various information such as information about cells that have been moved from the first vessel 11 to the second vessel 12a vessel, and a vessel (here the first vessel 11) that held the cells before, is stored in the storage section 12b, information such as history information that was stored in the storage section 17 is cleared. Once temporary storage has been cleared, step 1 is returned to and the previously described operations are performed. It should be noted that with this embodiment, history information is stored in the storage section within the vessel that is holding cells (this also includes an operating fixture) in accordance with movement of cells. However, this is not limiting, and it is also possible to provide a storage section that manages all processing for contents, such as cells, and to store information in this storage section.

On the other hand, if the result of determination in step S7 is that second approach cannot be detected, it is determined whether or not it is within a specified time (S12). If it was possible to detect approach of the first vessel 11 and the second vessel 12 by the approach detection section 13b, it is also possible to detect approach (second approach) using image data from the imaging section. Here it is determined whether or not a specified time has elapsed. If second approach is determined within this specified time, information such as history information is then written to the storage section 12b of the second vessel 12. The specified time may be sufficient time for determining that the first and second vessels 11 and 12 have approached. If the result of determination in S12 is within the specified time, step S1 is returned to and the previously described operations are performed. However, if step S1 is returned to and approach of the first vessel 11 has been detected in step S3, in step S5 only the time of detection is additionally stored into the temporary storage.

On the other hand, if the result of determination in step S12 is that within a given time has elapsed, error determination is performed. In a case where it is not possible to detect second approach within a specified time after detection of first approach, it is determined that the first vessel 11 and the second vessel 12 have not approached, and processing returns to step S1.

In this way, with the information management system shown in FIG. 4, it is determined whether or not a first vessel having first information and a second vessel having second information have approached (S3, S7), and when it has been detected that the first and second vessels have approached first information is added to the second information. Specifically, if it is determined whether or not two vessels have approached (S3, S7), information (content information and vessel information) relating to a vessel (here the first vessel 11) that is holding content such as cells is acquired by the control section 15, and the information that has been acquired is added to the storage section 12b vessel (here the second vessel 12) to which the content such as cells have been moved (S9). This means that information is accumulated in the storage section of the vessel that the contents such as cells have been moved to, by moving information (history information) from the time when contents such as cells were initially processed at the same time every time the contents are moved. As a result, for processing of content such as cells it is possible to realize highly reliable traceability. It should be noted that in steps S3 and S7 it is possible to detect not only approach of the first and second vessels 11 and 12, but also to detect that an operation is being performed in both or either one of the vessels.

Also, with the information management device shown in FIG. 4, the first vessel 11 functions as a first storage section (memory), and the second vessel 12 functions as a second-story section (memory), and the communication section 13 is capable of communication with the first and second story sections. Also, the communication section 13 and the control section 15 detect approach of a first storage section to an information management device at a first time, and detect the second storage section approaching an information management device at a second time that follows the first time, and it is possible to make a period from the second time to a third time that follows the second time an enable period in which it is possible to add information that has been stored in the first storage section to the second storage section. As was described previously, the first storage section (first vessel 11) and the second storage section (second vessel 12) are not limited to approaching the information when management device (approach detection section 13b) at the same time, and if from a second time at which both storage sections have approached to a third time (a given time to second approach determination (refer to S12)) becomes an enable period and second approach determination is issued in this period, information is added to the second storage section. Even if an operator mistakenly brings two vessels close together, since there is the enable period until the third time it is possible to easily cancel adding of information, and it is possible to prevent adding of erroneous information.

It should be noted that in the flow shown in FIG. 4B, approach of the first and second vessels has been determined in step S7, but this is not limiting, and it is also possible to perform determination of criteria other than approach, such as whether or not an operation has been performed with the first and/or second vessel. An operation detection section is therefore provided in order to detect a specified operation in an enable period. For example, in the event that the first and second vessels 11 and 12 have approached, the enable period is commenced together with temporary storage of information in a temporary storage section 17. In the enable period, determination of operation other than approach may be for whether there has been transition of information from temporary storage to actual storage, or clearing of temporary storage of the temporary storage section 17 (cancelling of transition of information to actual storage), by means of operating an operation switch that has been provided in a vessel or tool (for example, using a suction/discharge switch provided in a pipette, or a bending sensor and pressing for sensor provided on fingers as described in FIG. 5 for substituting as art operation switch for the purpose of the determination based on information that has been acquired by the bending sensor and pressing force). It should be noted that instead of providing an operation switch in a vessel or tool, operation may be detected using a camera α, and information may be respectively added and stored in the storage sections of the first and second vessels 11 and 12. Further, time that has been stored or information that has been stored may be stored (added) aligned in the order in which they were stored.

As a result of providing the operation detection section as described above and detecting a specified operation in the enable period, by confirming time change of information that has been added and an order in which the information was added, it is possible to retroactively store history of how close items were to each other and movement of contents as evidence. That is, the way in which information is received (from the first vessel to the second vessel, or from the second vessel to the first vessel) need not be limited, as long as time of receipt and the order of receipt are stored.

Also, with the information communication device shown in FIG. 4A and FIG. 4B, the control section 15 functions as a processor (storage control section) that, when proximity signals corresponding to approach to the information communication device (communication section 13) of the first memory (storage section (first vessel 11)) storing the first information, and approach to the information communication device (communication section 13) of the second memory (storage section (second vessel 12)) storing the second information has been detected by the detection circuit, adds second information that has been stored in the second memory (storage section) to first information that has been stored in the first memory (storage section), and stores in respective memory (storage sections). In other words, first information is added to the second memory that stores second information, based on detection of proximity signals that have been detected by the detection circuit. This means that if the first and second memories (storage sections) approach, information that has been stored in one memory (storage section) is added to the other memory (storage section), and so respective information is accumulated, identity of contents etc. can be ensured, and it is possible to improve reliability of traceability. With the example shown in FIG. 4A and FIG. 4B, the storage control section causes the communication section 13 to perform exchange of information between the control section 15 and the first and second vessels 11 and 12, but the functions of the storage control section and/or the communication section may be implemented within the first and second vessels 11 and 12, and the functions of the temporary storage section 17 may be implemented in the storage section 12b of the second vessel 12 (or the storage section of the first vessel 11). Further, the control section 15 functions as a processor that is capable of communicating with a detection circuit (for example, the communication section 13) that detects the first vessel having first memory (storage section), the second vessel having the second memory (storage section), and operation detection corresponding to operation for the first and second vessels. Then, history information that has been stored in the first memory is read out based on an operation signal that has been detected by the detection circuit, history information, information related to the second vessel and/or information relating to the operation are added to the second memory, and the history information is rewritten (refer to FIG. 2).

Next, a more detailed structure and operation of the information management system of one embodiment of the present invention will be described using FIG. 5 to FIG. 14B.

Figure 5:
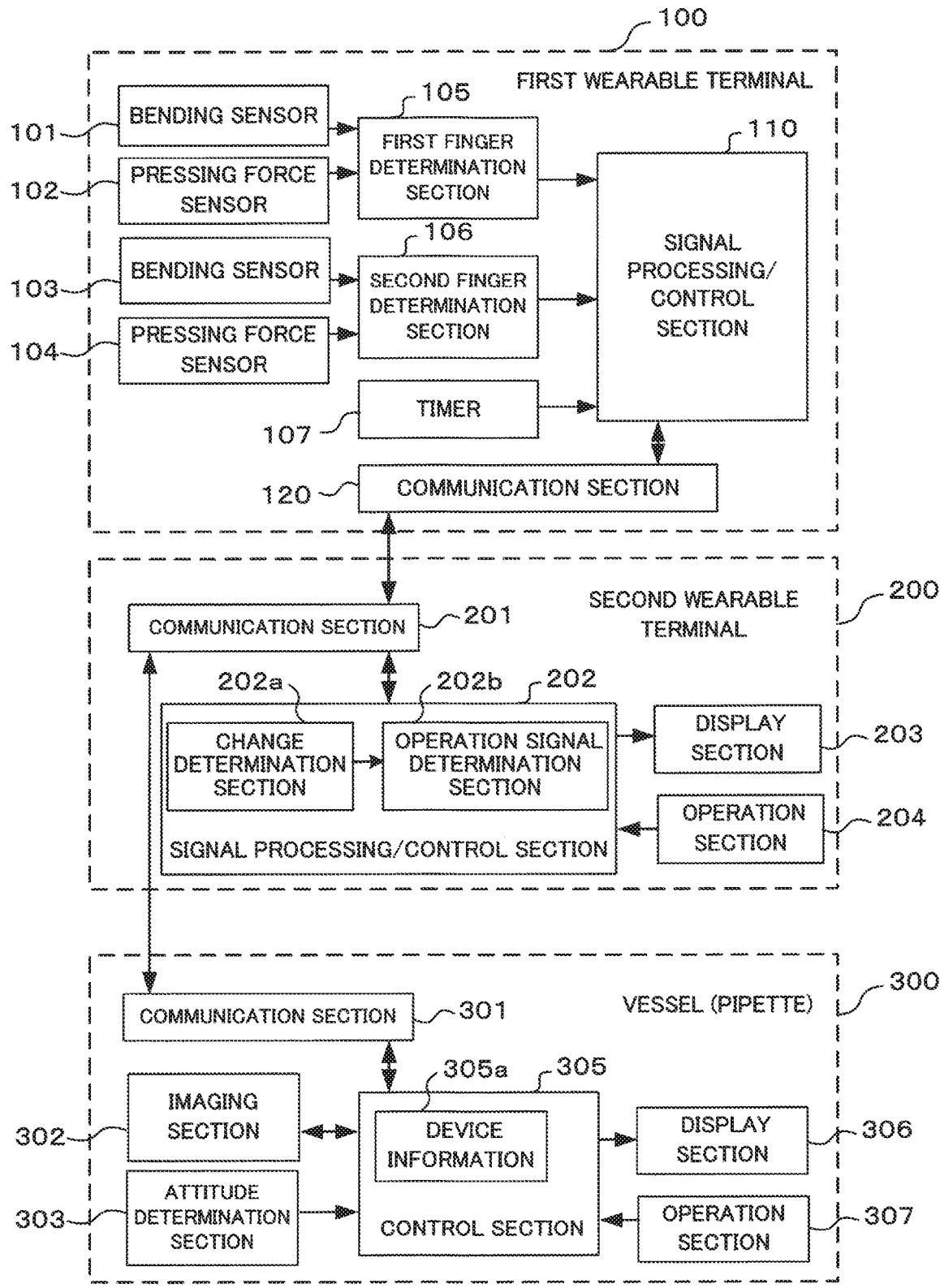
FIG. 5 is a block diagram showing a more specific structure of the information management system of one embodiment of the present invention.

First, the structure of the information management system will be described using FIG. 5. The information management system shown in FIG. 5 comprises a first wearable terminal 100, a second wearable terminal 200, and a vessel 300. It should be noted that in FIG. 5, only two wearable terminals and a single vessel are shown, but it is also possible for an information management system to be made up of numerous wearable terminals and a plurality of vessels, as with the examples shown in FIG. 9 to FIG. 11.

Figure 9:
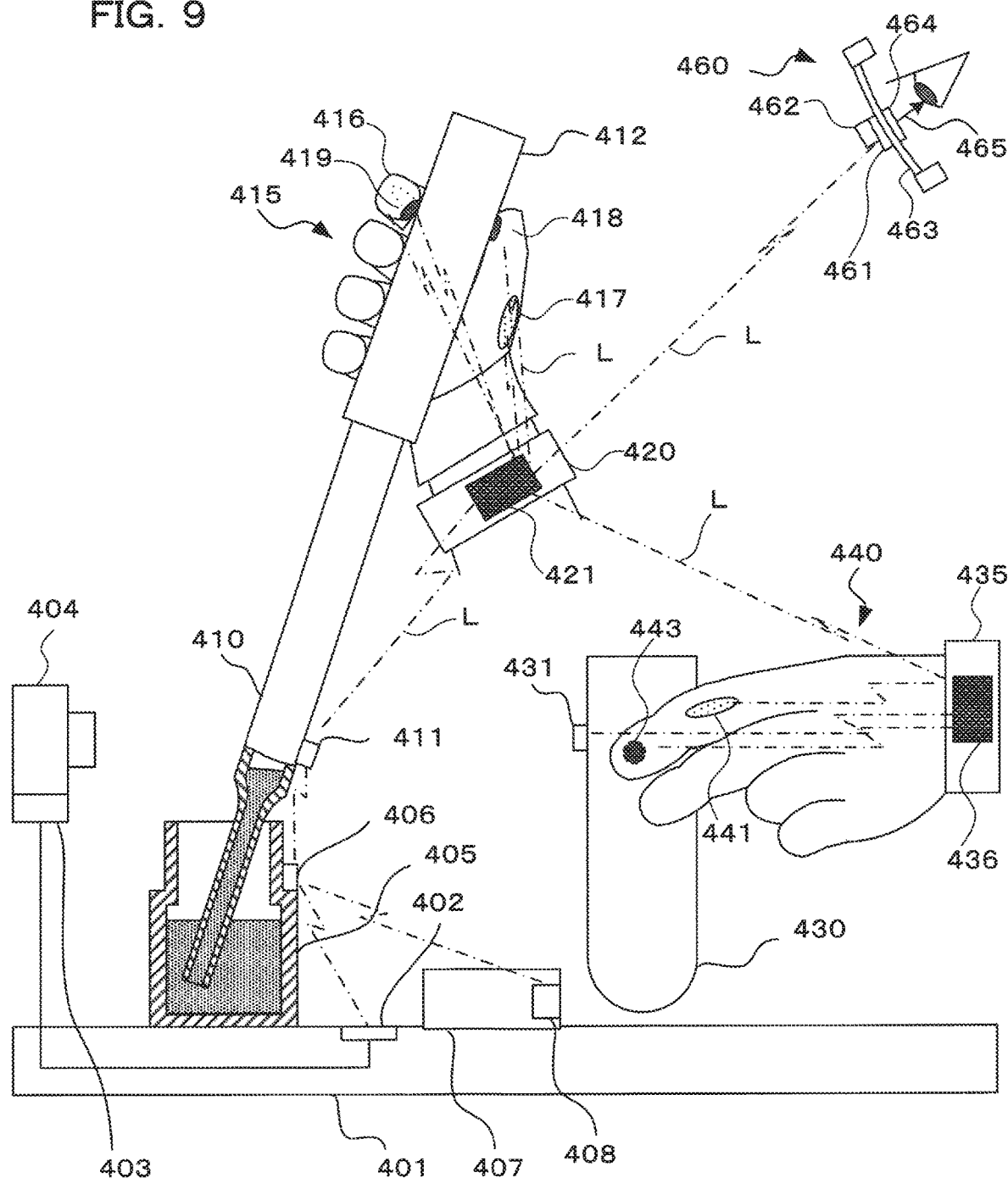
FIG. 9 is a drawing for describing processing content of a first operation in the information operation system of one embodiment of the present invention.

A first wearable terminal 100 is provided in clothing with which an operator will actually contact a vessel or the like, such as the glove R415 or glove L440 shown in FIG. 9. This first wearable terminal 100 comprises bending sensors 101 and 103, pressing force sensors 102 on 104, a first finger determination section 105, a second finger determination section 106, a timer 107, a signal processing/control section 110, and a communication section 120.

The pressing force sensors 101 and 103 are finger parts of the glove R415 and the glove L440 (FIG. 9), and are arranged in portions where shape changes when bent by the operator's fingers grasping a vessel etc., and output detection signals corresponding to degree of bending. The first finger determination section 105 and the second finger determination section 106 determine bending states of the operator's fingers based on detection signals from the bending sensors 101 on 103. It should be noted that the bending sensors 101 and 103 are not limited to being provided in gloves, as long as they are bending sensors that are arranged in operator clothing that is used to hold a vessel.

The pressing force sensors 102 and 104 are finger parts of the glove R415 and the glove L440 (FIG. 9), and are sensors that are arranged in portions that make contact when the operator grasps a vessel etc., and output detection signals corresponding to degree of pressing force. The first finger determination section 105 and the second finger determination section 106 determine gripping states of the operator's fingers based on detection signals from the pressing force sensors 102 and 104. It should be noted that the pressing force sensors 102 and 104 are not limited to being provided in gloves, as long as they are pressing force sensors that are arranged in operator clothing that is used to hold a vessel.

The timer 107 generates time and date information and this time and date information is output to the signal processing/control section 110. Time and date information may be stored together with updating history information when an operation has been performed.

The signal processing/control section 110 is a processor having a computer processing device such as a CPU (Central Processing Unit), and may perform control in accordance with a program, and may also be a processor that performs digital signal processing. The signal processing/control section 110 is input with determination results from the first finger determination section 105 and the second finger determination section 106, determines operating states for fingers the operator is using (for example, holding a vessel, sucking up liquid with a pipette, discharging liquid with a pipette, stirring liquid etc.), and outputs the result of this determination, and time and date information that has been input from the timer 107, to the communication section 120.

The communication section 120 has a communication circuit such as wireless, and outputs determination results for states of the operator's fingers that have been output from the signal processing/control section 110, and time and date information, to the communication section 201 of the second wearable terminal 200.

The second wearable terminal 200 is provided in the vicinity of the operator's clothing, like the bracelet that is worn on the operators arm FIG. 9. A communication section 201, signal processing/control section 202, display section 203, and operation section 204 are provided in the second wearable terminal 200. It should be noted that depending on the terminal there may be cases where the display section 203 and operation section 204 etc. are not required, and may be omitted in such cases, and depending on the terminal, required members may be provided. Information that makes it possible to identify the operator may also be stored. In this case, it is possible to write operator information in association with operation information in the history information.

The communication section 201 has a communication circuit such as wireless, receives determination results for states of the operator's fingers and time and date information that have been output from the communication section 120 and receives information from the communication section 301 of the vessel 300, and outputs these received items of information to the signal processing/control section 202.

The signal processing/control section 202 is a processor having a computer processing device such as a CPU (Central Processing Unit), and may perform control in accordance with a program, and may also be a processor that performs digital signal processing. The signal processing/control section 202 has a change determination section 202*a* and an operation signal determination section 202*b*. The change determination section 202*a* determines whether or not there is change in operating state in the fingers the operator is using that has been transmitted from the first wearable terminal 100. Also, the operation signal determination section 202*b* determines an operator operation based on a detection signal that has been input from the operation section 204. It should be noted that the change determination section 202*a* and operation signal determination section 202*b* may be realized in software using a CPU and program, and may also be realized using hardware circuits.

The operation section 204 has operation members such as operation buttons, and/or a touch panel, and is an interface for input of operator instructions. The display section 203 has a display panel, and displays menu screens and operating states using the signal processing/operation signal determination section 202.

The vessel 300 is a vessel for holding or processing content such as cells etc., such as a pipette, vessel or vessel lid that is operated by the user in FIG. 9. The communication section 301, imaging section 302, attitude determination section 303, control section 305, display section 306 and operation section 307 are provided in the vessel 300. It should be noted that depending on the terminal there may be cases where the imaging section 302, attitude determination section 303, display section 306, operation section 307 etc. are not required, and may be omitted in such cases, and depending on the terminal, required members may be provided. For example, in the case of a spectacles type wearable terminal, the imaging section may be provided.

The communication section 301 has a communication circuit such as wireless, and outputs various information such as device information, attitude determination results, operation information etc. from the control section 305, and various information such as device information and history information that has been stored in the control section 305, to the communication section 201.

The imaging section 302 has an imaging lens and image sensor, and acquires image data and outputs this image data to the control section 305. The attitude determination section 303 has a sensor for attitude detection. The attitude determination section 303 determines attitude of the vessel 300, for example, arranged horizontally, arranged inclined, moving upwards, moving downward etc., and outputs determination results to the control section 305.

The control section 305 is a processor having a computer processing device such as a CPU (Central Processing Unit), and may perform control in accordance with a program, and may also be a processor that performs digital signal processing. The control section 305 has an electrically rewritable non-volatile memory for storing the device information 305*a*. This device information 305*a* stores various information (including history information), as will be described later using FIG. 6 to FIG. 8. The control section 305 reads out device information 305*a* and outputs to the signal processing/control section 202 of the second wearable terminal 200, and stores information that has been transmitted from the signal processing/control section 202 as device information 305*a*.

The operation section 307 has operation members such as operation buttons, and/or a touch panel, and is an interface for input of operator instructions. The display section 306 has a display panel, and displays menu screens and operating states using the control section 305. It should be noted that although the imaging section 302 etc. have been arranged within the vessel 300 in FIG. 5, in FIG. 9, which will be described later, these components are arranged separately to the vessel 300. Also, besides the imaging section 302, the attitude determination section 303, display section 306 and operation section 307 may also be omitted, like the second vessel 12 that was shown in FIG. 4A.

Figure 6:
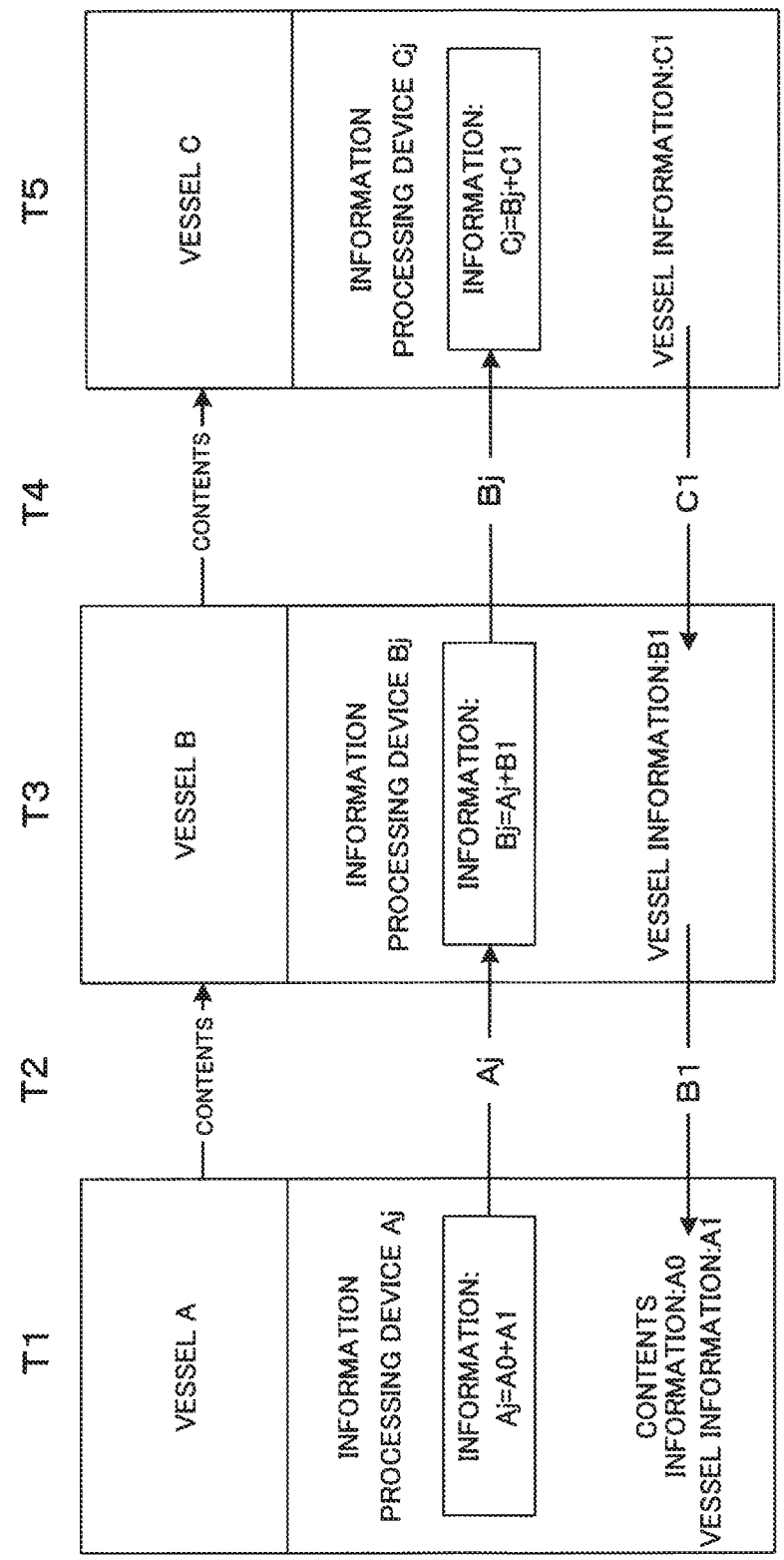
FIG. 6 is a drawing for describing delivery of information of an information management system of one embodiment of the present invention.

Next, information transmission of this embodiment will be described using FIG. 6 to FIG. 8. FIG. 6 is the case where only vessel information is transmitted, as was shown in FIG. 1. In this case contents (including content such as cells) are sequentially moved in the order vessel A, vessel B, vessel C. Vessels A, B and C are constructed as shown by the vessel 300 of FIG. 5, and may have any structure as long as it resembles the second vessel 12 shown in FIG. 4.

In FIG. 6, the vessel A has an information processing device Aj. At time T1 the information processing device Aj stores content information A0 and vessel information A1 as information Aj (refer to the device information 305a of FIG. 5). It should be noted that in FIG. 5 the information processing device Aj corresponds to the control section 305 etc., but is not necessarily constructed integrally with the vessel, and may be constructed separately from the vessel (the same also applies to FIG. 7 and FIG. 8).

If the contents of vessel A have been moved to vessel B at time T2, then at time T3 the information processing device Bj provided in vessel B stores vessel information B1, in addition to information Aj of vessel A, as information Bj. Specifically, if the fact that the contents of vessel A have been moved to vessel B is detected by the first and second wearable terminals, then the content information A0 stored in vessel A, and the vessel information A1 and B1, are temporarily transmitted to the second wearable terminal and information Bj is generated. The information Bj that has been generated here is transmitted to vessel B and stored. In this way, content information A0 and information on the initial vessel A and the next vessel B are stored within vessel B.

Next, if the contents are moved from vessel B to vessel C at time T4, then at time T5, similarly to the case of vessel B, the information processing device Cj that is provided in vessel C stores vessel information C1, in addition to information B of vessel A and vessel B, as information Cj. In this way, the content information A0, and information of the initial vessel A, the second vessel B, and the third vessel C are stored within vessel C.

In this way, the initial content information A0 is transmitted every time a vessel approaches to within a specified distance of another vessel. Also, content information is cumulatively appended and transmitted every time a vessel approaches to a specified distance of another vessel. It should be noted that description has been given where vessel information and contents information is temporarily moved from a vessel to another vessel through the second wearable terminal, but it is also possible to directly exchange information between vessels without going through the second wearable terminal. Also, this is not limiting and information may also be transmitted through the first wearable terminal, or information management may be performed in a separate room, a building etc. or on a server for integrating a processing system by being installed therein.

Figure 7:
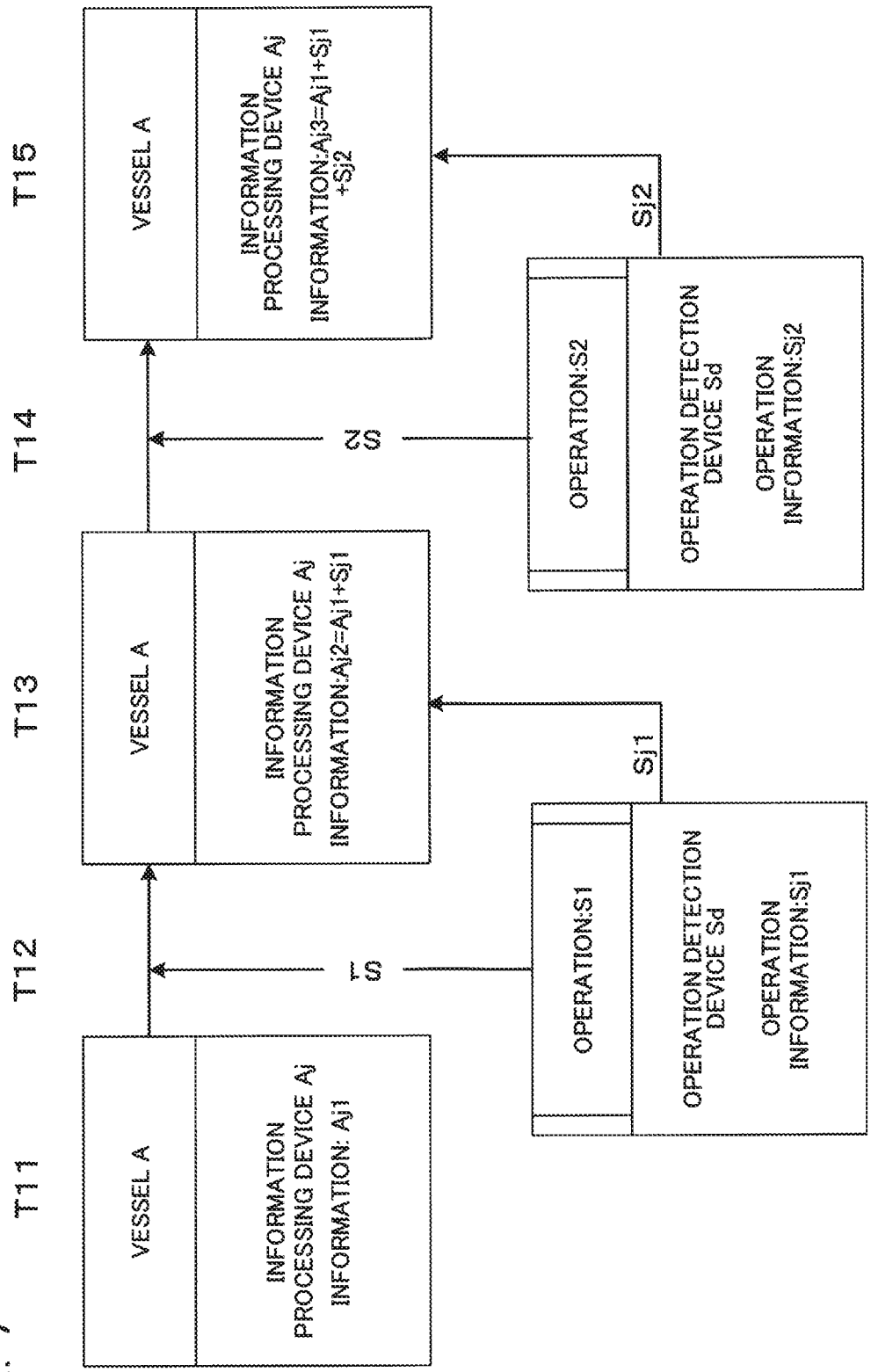
FIG. 7 is a drawing for describing a first modified example of delivery of information of an information management system of one embodiment of the present invention.

FIG. 7 shows a case where process information (operation information) is transmitted. With the example shown in FIG. 7, a case is shown where operations S1 and S2 and are performed on content such as cells that are contained in vessel A. First, at time T11, information Aj is stored in the information processing device Aj of the vessel A in which the contents are contained.

At time T12, operation S1 is performed on the contents of vessel A. The operation S1 at this time is detected by the operation detection device Sd, and operation information Sj1 at this time is transmitted to the information processing device Aj of vessel A. At time T13, the information processing device Aj of vessel A generators information Aj2 and stores this information, by adding operation information Sj1 that has been transmitted to the information Aj1 (refer to the device information 305a in FIG. 5).

At time T14, operation S2 is performed on the contents of vessel A. The operation S2 at this time is detected by the operation detection device Sd, and operation information Sj2 at this time is transmitted to the information processing device Aj of vessel A. At time T15, the information processing device Aj of vessel A generates information Aj3 and stores this information, by adding operation information Sj2 that has been transmitted, in the information Aj2 (refer to the device information 305a in FIG. 5).

In this way, with the example of information transmission shown in FIG. 7, every time an operation is performed that operation information is added to the storage section, such that information that is stored in the storage section of the information processing device Aj is cumulatively rewritten from Aj1 to Aj2. This means that if information (device information 305a) that is stored in the information processing device Aj that is associated with vessel A is read out, it is possible to easily confirm history of operational content that has been performed on the contents. It should be noted that the operation detection device Sd may detect operations based on sensor output that has been acquired by bending sensors 101 and 103 and pressing for sensors 101 and 102 etc. provided in gloves, and in operational tools and fixtures, and may be detected by analyzing image data that has been acquired by the imaging section 302.

Figure 8:
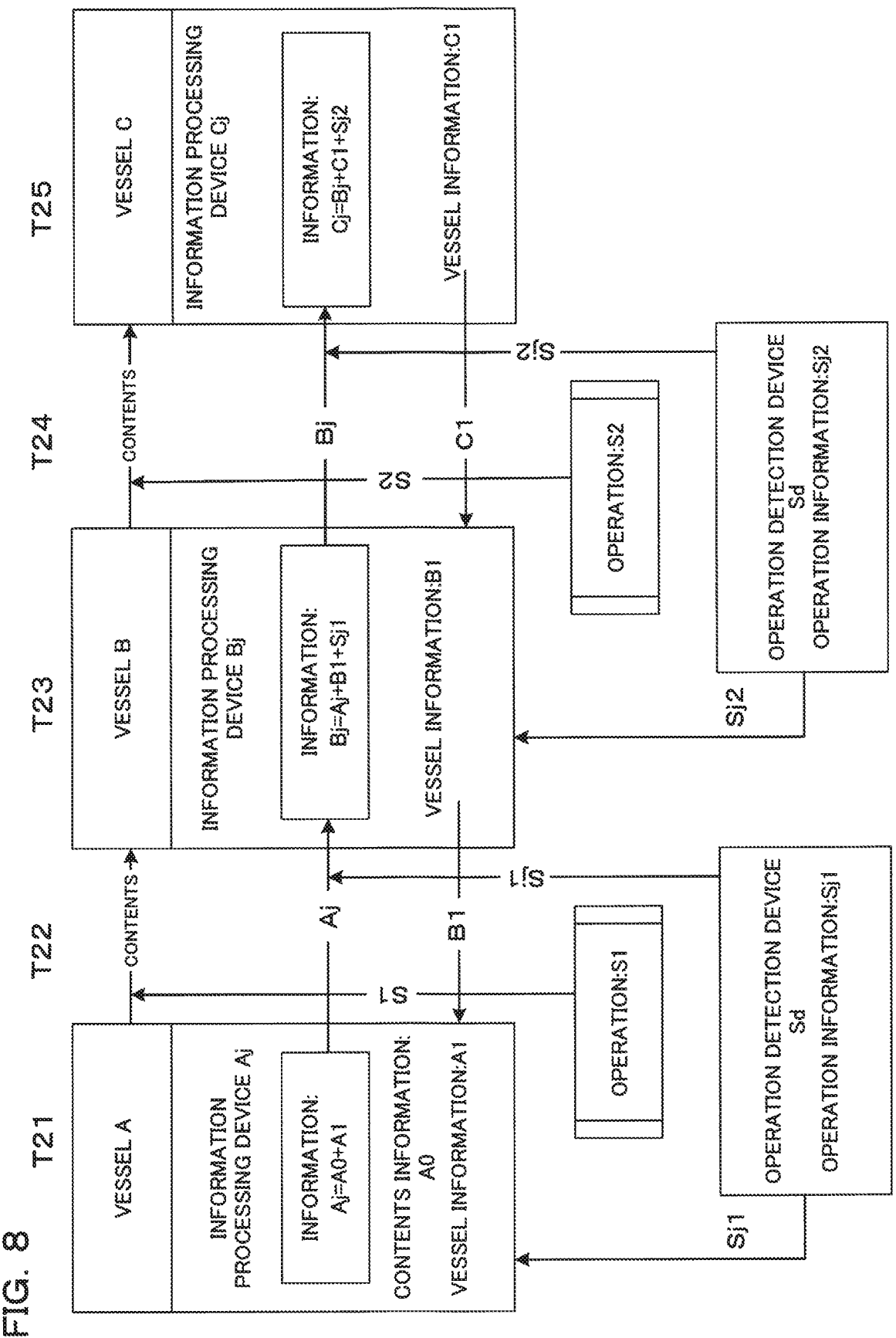
FIG. 8 is a drawing for describing a second modified example of delivery of information of an information management system of one embodiment of the present invention.

FIG. 8 shows a case where vessel information and process information (operation information) is transmitted. With the example shown in FIG. 6 vessel information was transmitted and in the example shown in FIG. 7 process information was transmitted, but with the example shown in FIG. 8 both vessel information and process information are transmitted.

At time T21, information processing device Aj is associated with vessel A, and contents A0 are contained in this vessel A. At this time, information Aj that is made up of content information A0 and vessel information A1 is stored in the storage section of the information processing device Aj.

At time T22, operation S1 is performed on the contents contained in vessel A, and the contents are moved to vessel B. This operation S1 is detected by the operation detection device Sd and operation information Sj1 is output. At time T23, the information processing device Bj of vessel B, which is where the contents are moved to, stores information Bj, having vessel information B1 and operation information Sj1 added to information Aj of the information processing device Aj of vessel A, in the storage section of the information processing device Bj.

At time T24, operation S2 is performed on the contents contained in vessel B, and the contents are moved to vessel C. This operation S2 is detected by the operation detection device Sd and operation information Sj2 is output. At time T25, the information processing device Cj of vessel C, which is where the contents are moved to, stores information Cj, having vessel information C1 and operation information Sj2 added to information Bj of the information processing device Bj of vessel B, in the storage section of the information processing device Cj.

In this way, with the example of information transmission shown in FIG. 8, every time contents are moved and an operation is performed, information that is stored in the storage section of the information processing device Aj is cumulatively rewritten to Aj, Bj and Cj. This means that if the newest information (device information 305a) that is stored in an information processing device that is associated with a vessel is read out, it is possible to easily confirm history of a vessel that held contents and operational content that has been performed on the contents. It should be noted that with the example shown in FIG. 8, an operation was associated with contents being moved, but operations are not necessarily associated. Specifically only movement of contents may be performed, and only operations may be independently performed.

Also, in a case where contents are moved from vessel to vessel, information transmission need not be in one direction. For example, since there are also cases where a vessel is reused, that may be the information flow shown by C1 and B1. The above described vessel information is not only information relating to type of vessel and contents, and in a case where operations are performed information on that operational content, and information showing increase and reduction in contents at that time, may be used as vessel information. For example, if there is historical information such as that contents have reduced or increased due to a pipette having been inserted, been lost by being tilted, or increased by being poured from above, what type of operation was performed remains as history. The appearance of operations at that time may be imaged and stored, and information attached to images that have been formed. Tags showing history such as whether images are of operations or contents etc. may also be attached to a series of images. If time when a vessel has approached is detected, and images that have been taken of that operation stored, later confirmation becomes simple.

Also, description has been given where vessel information and contents information are temporarily moved from a vessel to another vessel through the second wearable terminal, but it is also possible to directly exchange information between vessels without going through the second wearable terminal. Also, this is not limiting and information may also be transmitted through the first wearable terminal, or a processing system that presides over a room or a building etc. where processing is performed may be provided, and information management performed on the server.

Next, an example of information management of this embodiment at the time of movement and operation of contents will be described using FIG. 9 to FIG. 11. The operational example here is an operation to suck up contents (culture medium) contained in a vessel C 405 with a pipette 410, and move to a test tube 430. Shape of the pipette 410 is recognized, and contents that were not detected in a tube section of the pipette 410 sequentially penetrating are detected using images. The fact that an operator has operated an operating section of the pipette 410 may be determined by change in images. Movement of the operator's body may be detected directly using a dedicated mounting fixture. Appearance of contents entering into the test tube 430 may be determined using images. Increase and decrease in vessel contents may be determined using change in weight and change in images, and a movement relationship of contents between two fixtures may be determined. Change in weight can be determined using a gravimeter or the like that has been provided below the vessel. Whether or not there are contents may also be determined. The same operator holding respective vessels in either hand may be detected and a relationship between the vessels and the hand positions (whether they are looking from above or below, whether there inclination, positional relationships between vessel openings etc.) may be determined using images. It is also possible to perform determination with dedicated sensors such as an inclination sensor or a proximity sensor.

As shown in FIG. 9, an information processing device αi402 and a camera Kα404 are provided on an operation table α401. The camera Kα404 has an information processing device Kαj403. A vessel C 405 in which the culture medium is stored, and a lid 407 of the vessel C 405 are placed on the operation table α401. An information processing device Cj 406 is provided in the vessel C 405, and an information processing device Cj' 408 is provided in the lid 407. An image sensor within the camera Kα404 functions as an image sensor that images first and second vessels.

An operation section 412 and an information processing device dj 411 are provided in the pipette d 410 that is capable of sucking up culture medium. It is possible to suck up culture medium by pressing the operation section 412. In FIG. 9, this operation section 411 is retained by the operator's right hand glove R415 (first wearable section). In the glove R415, bending sensors 416 and 417 are arranged at finger joint portions, and pressing force sensors 418 and 419 are arranged at finger clasping portions.

Also, a bracelet R420 (second wearable section) is worn on the operator's right arm. The bracelet R420 is a terminal corresponding to the second wearable terminal 200 of FIG. 5, and receives output of each of the sensors of the glove R415 that corresponds to the first wearable terminal. Also, outputs from the previously described information terminals αj402, Kαj403, Cj406 and Cj' 408 are received via a signal line L, and instructions are output as required. Further, outputs from an information terminal ej432, transmission information processing device Gj461, and operation information processing device Lj436, which will be described later, are also received via the signal line L, and instructions output as required. It should be noted that the signal line L is the line for wired or wireless connection.

The glove L440 (third wearable section) is worn on the operator's left-hand, and the test tube e430 is gripped using this glove L440. In the glove L440, a bending sensor 441 is arranged at a finger joint portion, and a pressing force sensor 418 and 443 is arranged at finger clasping portion. Also, a bracelet L435 (fourth wearable section) is worn on the operators left arm. The bracelet L435 is a terminal corresponding to the second wearable terminal 200 of FIG. 5, and receives output of each of the sensors of the glove R415 that corresponds to the first wearable terminal. An operation information processing device Lj436 is provided in this bracelet L435, and detection signals from the bending sensor 441 and the pressing force sensor 443 are transmitted to the operation information processing device Rj421 of the bracelet R420.

The test tube e430 can contain contents such as culture medium, and if the test tube e430 is gripped by the glove L440 detection signals from the bending sensor 441 and the pressing force sensor 443 are output, with these detection signals being transmitted to an operation information processing device Ri421 via the operation information processing device Lj436. Also, an information processing device ej431 is provided in the test tube e430.

It is also possible for the operator to where spectacles G460 (fifth wearable terminal). These spectacles G460 have a transmission information processing device Gj461, a camera section Gα462, a lens 463 and an image display device 464. It is possible to observe the vessel 405, pipette d 410 and test tube e430 etc. through the lens 463, image data of these observed items are acquired simultaneously by the camera Gα462, and it is possible to visually recognize various image information 465 using the image display device 464.

Also, the transmission information processing device Gj461 is provided in the spectacles G460, information such as image data that has been acquired by the spectacles G460 is transmitted to the operation information processing device Ri421 within the bracelet R420, and it is possible to receive information. Information that has been received can be displayed to the operator by means of the image display device 464 that was described previously.

The operation information processing device Rj421 of the bracelet R420 corresponds to the signal processing/control section 202 of the second wearable terminal 200, and if the pipette d 410 approaches the vessel C 405, the fact that the pipette d 410 has approached the vessel C 405 is determined based on signals L from the information processing device Cj of the vessel C 405 and from the information processing device dj 411 of the pipette d 410. Also, sucking up of culture medium is determined based on detection signals from the bending sensor on the pressing force sensor.

If sucking up of culture medium is determined, the operation information processing device Rj421 reads out information Aj (refer to FIG. 6 and FIG. 8) from within the information processing device Cj 406, further generates information comprising the addition of vessel information for the pipette d 410 and operation information for the sucking operation, and stores the information that has been generated in the storage section within the information processing device dj within the pipette d 410.

Figure 10:
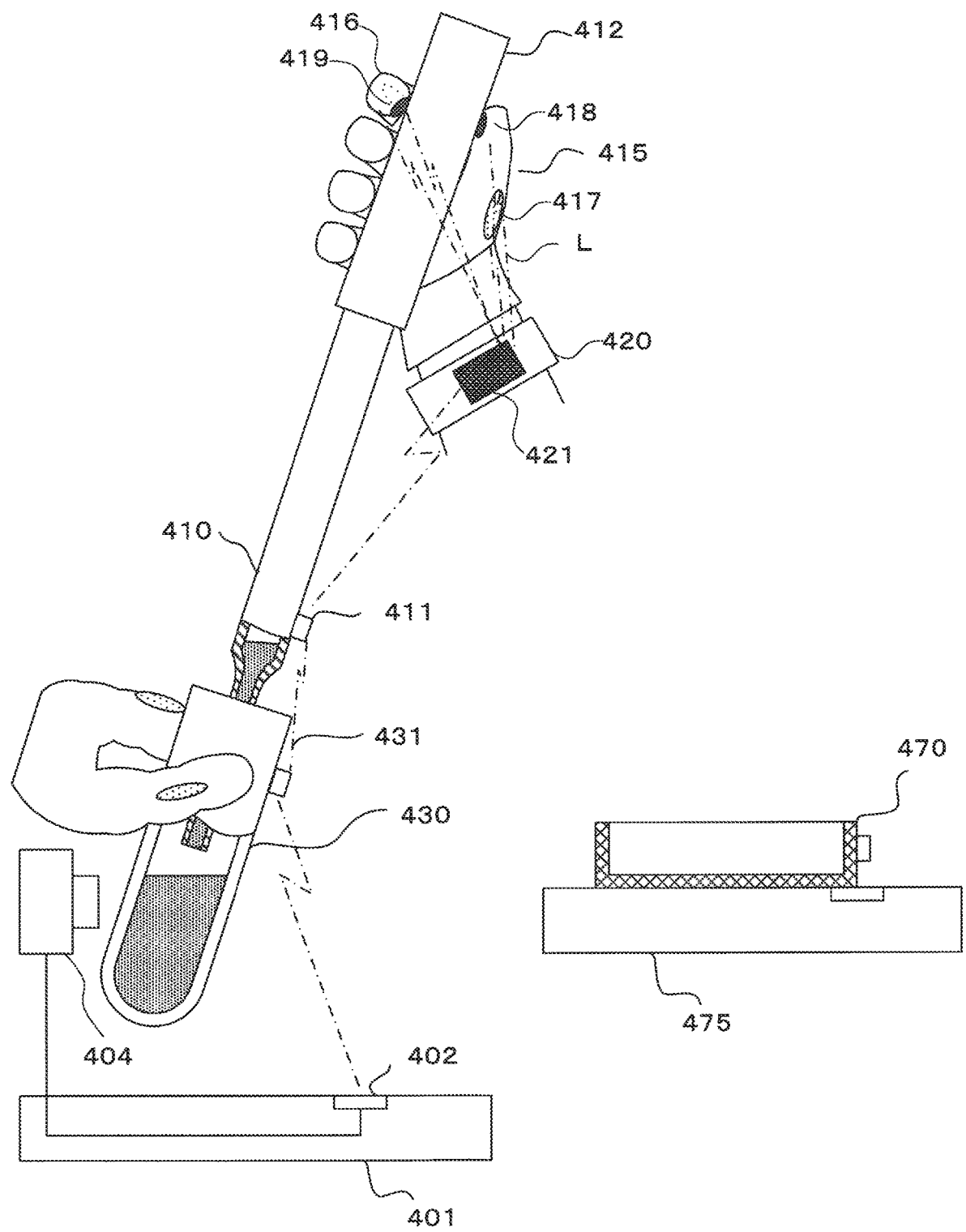
FIG. 10 is a drawing for describing processing content of a second operation in the information operation system of one embodiment of the present invention.

As shown in FIG. 9, if the pipette d 410 has sucked up culture medium then next, as shown in FIG. 10, the culture medium that was sucked up with the pipette d 410 is discharged into the test tube e430. If the test tube e430 approaches the pipette d 410, the operation information processing device Rj421 of the bracelet R420 determines that the test tube e430 has approached the pipette d 410 based on signals L from the information processing device dj 411 of the pipette d 410 and from the information processing device Cj431 of the test tube e430. Also, sucking up of culture medium is determined based on detection signals from the bending sensor and the pressing force sensor. It should be noted that as operation information, discharge of culture medium may be determined based on image analysis of image data that has been acquired by the camera Kα404 or the camera Gα462, and may be determined based on detection signals from sensors of the glove R415.

If discharge of culture medium is determined, the operation information processing device Rj421 reads out information Bj (refer to FIG. 6 and FIG. 8) from within the information processing device bj411, further generates information comprising the addition of vessel information for the test tube e430 and operation information for the discharge operation, and stores the information that has been generated in the storage section within the information processing device Cj within the test tube e430.

Next, information management when culture medium and cells that have been cultivated within the test tube 430 are moved to a vessel E470 will be described using FIG. 11. The pipette D480 in FIG. 11 is for preventing contamination, and a tip portion is exchangeable. Also, an information processing device Dj481 of the pipette D480 reads information from the vessel for cultivation and cumulatively stores this information, when cells etc. that have been cultivated in the pipette D480 are sucked up. Operation to suck up cells etc. that have been cultivated in the pipette are the same as for the operation described with FIG. 9, and so detailed operation is omitted.

Also, the operation at this time is performed on an operation table β475, and an information processing device βj476 and camera Kβ477 are provided on this operation table β475. Also, the vessel E470 is placed on the operation table β475, and an information processing device Ej471 is provided in this vessel E470. It should be noted that approach of vessels, and operations etc., may be determined based on image data that has been acquired by the camera Kβ477 or the camera Gα462.

Figure 11:
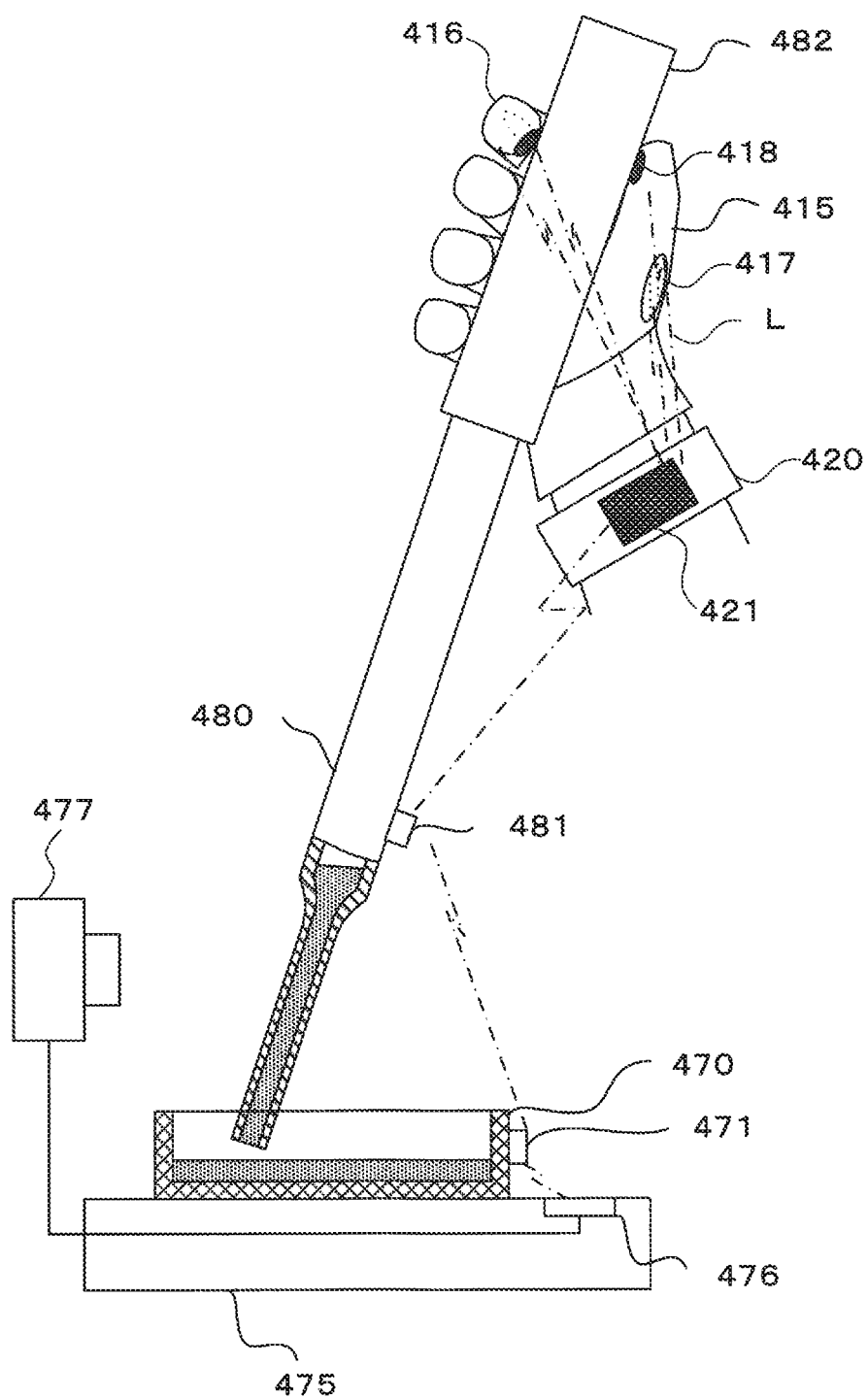
FIG. 11 is a drawing for describing processing content of a third operation in the information operation system of one embodiment of the present invention.

In FIG. 11, if the operator brings the pipette D480 close to the vessel E470, then the information processing device Rj of the bracelet R420 detects that the two have become close. Then, if the operator presses the operation section 482 of the pipette D480 that has the culture medium that has been sucked up, the culture medium is discharged into the vessel E470. At this time the bending sensor 416 and the pressing force sensors 418 and 419 output detection signals in accordance with pressing operations by the operator. The information processing device Rj detects that the pipette D480 has approached the vessel E470, and information indicating that culture medium has been discharged from the pipette D480 is transmitted to the information processing device βj476 of the vessel E470. The information processing device βj476 cumulatively stores information that has been received in history information that is stored in the storage section.

In this way, with the information management for operation shown in FIG. 9 to FIG. 11, if an operation is performed close to a vessel etc., contents information, vessel information, and operation information is transmitted to an information processing device that the contents are moved to, and information is cumulatively added. As a result, history information for operational content that was performed on vessels that held contents, or on contents, can be simply read out from the storage section within the information processing device of a current vessel.

It should be noted that in the information management shown in FIG. 9 to FIG. 11, centering on the information processing device Rj421 within the bracelet R420, information from related vessels is collected, and information is written to the information processing device to which contents are moved. This is not limiting, however, and information management may also be performed centering on an information processing device that has been provided on an operation table. Also, information may be collected and information written centering on an information processing device of a vessel to which contents are moved. Further, information may be transmitted by the first wearable terminal, or a server that provides overall integration may be provided, or information collected on the server, and history information stored.

Next, one example of information management will be described using the flowcharts shown in FIG. 12 to FIG. 14B. These flowcharts are executed by a processor such as a CPU within the signal processing/control section 202 within the second wearable terminal 200, with the example shown in FIG. 5, based on a program, and with the examples shown in FIG. 9 to FIG. 11 are executed by a processor such as a CPU within the operation information processing device Rj within the bracelet R420 that corresponds to the second wearable terminal 200, based on a program.

Figure 12:
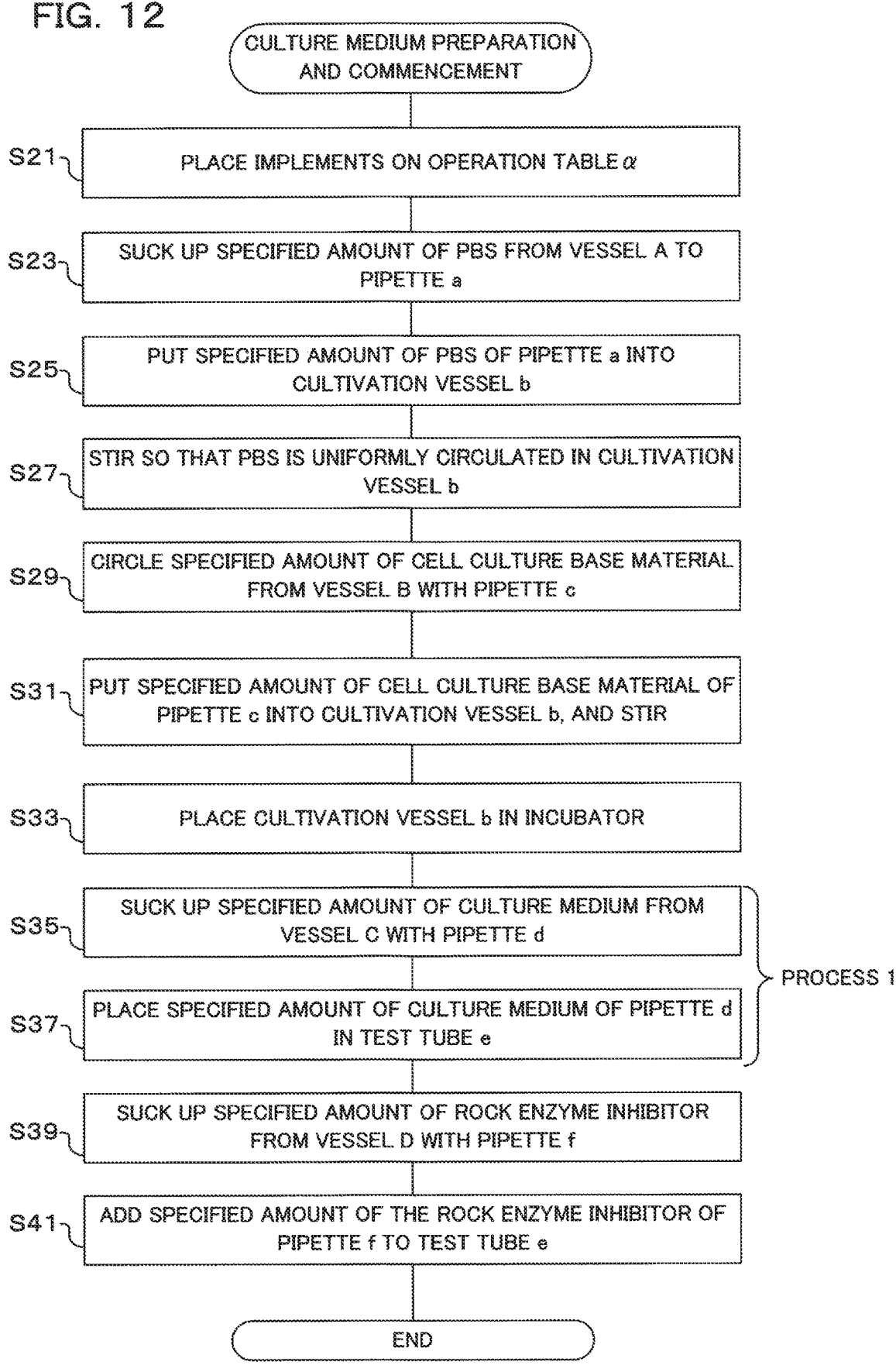
FIG. 12 is a flowchart showing a culture medium preparation operation in an information management system of one embodiment of the present invention.

The flow shown in FIG. 12 shows preparation of a culture medium for cell cultivation (cultivation of iPS cells). If this flow for culture medium preparation is entered, first, implements used in operations are placed on an operation table α (S21). Here, implements such as vessels, pipettes and test tubes (culture vessels) are placed on the operation table α401.

Next, a specified amount of PBS (phosphate buffered saline) it sucked up from the vessel A into the pipette a (S23). Here, the lid of the vessel A that the PBS is in is opened, and a specified amount of PBS is sucked up from the vessel A into the pipette a. Once sucking has been completed, the lid is put on the vessel A. At this time, contents information, vessel information, and operation information at this time are added to history information that has been read out from the storage section of vessel A, and written to the storage section of the pipette a as history information.

Next, a specified amount of the PBS of pipette a is put into the cultivation vessel b (S25). At this time, in addition to the history information that has been readout from the pipette a, history information including vessel information and operation information at that time are written to the storage section of the culture vessel b.

Next, stirring is performed so as to thoroughly circulate the PBS in the culture vessel b (S27). Here, in this step, the same vessel that was used in step S25 is used for an additional stirring operation. Then, in addition to the history information up to this point, operation information at this time is written to the storage section of the cultivation vessel b.

Then, a specified amount of a cell culture base material is sucked up from vessel 5 with a pipette c (S29). Here, since content (cell culture base material) has been newly sucked up from vessel B, vessel information and operation information at that time are written to history information that has been read out from vessel B, in the storage section of pipette c with which the sucking operation was performed.

Next, a specified amount of cell culture base material of pipette c is put into the cultivation vessel b and stirred (S31). Here, the cell culture base material that was sucked up in step S29 is uniformly coated on the cultivation vessel b into which PBS was placed in steps S25 and S27. At this time, in addition to history information that has been stored in cultivation vessel b up to now, operation information at that time is written to the storage section of the cultivation vessel b.

Next, the cultivation vessel b is arranged in an incubator (S33). At this time operation information for arranging the cultivation vessel b in the incubator (constant temperature oven) is added to history information that has been stored up to now, in the storage section of the cultivation vessel b. It should be noted that if information on the temperature etc. inside the incubator can be obtained, the temperature etc. inside the incubator may be stored in the history information.

Next, a specified amount of culture medium is sucked up from vessel C with a pipette d (S35). Here, in addition to history information that has been read out from vessel C, contents information (culture medium), vessel information (vessel C) and operation information (sucking operation) are written to the storage section of the pipette d. It should be noted that this step is the same as the operation that was described using FIG. 9.

Next, a specified amount of the culture medium of the pipette d is placed in a test tube e (S37). This operation is to subdivide the culture medium and to make the operation easy. In this step, in addition to history information that has been read out from the pipette d, vessel information (test tube e) and operation information is written to the storage section of the test tube e. It should be noted that this step is the same as the operation that was described using FIG. 10.

Next, a specified amount of ROCK enzyme inhibitor is sucked up from vessel D with pipette f (S39). The ROCK enzyme inhibitor is a Rho-associated coiled-coil forming kinase/Rho-linked kinase, that inhibits cell differential regulation, and makes survival rate of iPS cells high. In this step, in addition to history information that has been read out from vessel D, contents information (ROCK enzyme inhibitor), vessel information (vessel D) and operation information (sucking operation) is written to the storage section of the pipette f.

Next, a specified amount of the ROCK enzyme inhibitor of the pipette f is added to the test tube e (S41). Here, in addition to the history information that has been read out from the pipette f, contents information (ROCK enzyme inhibitor) from pipette f, vessel information (pipette f) and operation information (adding operation) are written to the storage section of the test tube e. As a result of the preparation operations of from steps S21 to S41, the cultivation vessel b that has been coated with cell culture base material, and the test tube e containing a specified amount of culture medium with a specified additive added, are prepared.

In this way, in the flow for culture medium preparation, vessels etc. approach, and if an operation is performed contents information, vessel information and operation information is written to a storage section of a unit that contents are moved to. Also, even if contents are not moved and there is an operation performed, operation information is written to the storage section.

Next, an example where some cells are moved to a new culture medium and re-cultivated, that is, subcultivation performed, will be described using the flowcharts shown in FIG. 13A to FIG. 13C. Here, an example of subcultivation of iPS cells will be described.

If the flow for subcultivation is commenced, first a cultivation vessel b for iPS cells is taken out from an incubator (S51). Operation information extracted from the incubator is stored in the storage section of the cultivation vessel b in addition to history information up to now.

Next, the cultivation vessel b is moved to a place on the operation table β where a microscope is situated (S53). Operation information showing that there has been movement to a place on the operation table β where the microscope is situated is written to the storage section of the cultivation vessel b.

Next, it is confirmed using the microscope whether cells have increased to a specified number (S55). The number of cells is detected from microscope images. This number of cells that has been detected and time and date information when measurement was performed may be written to history information. Also, in addition to the number or cells, information showing characteristics such as density and morphology of cells may also be written to history information.

In the event that cells have increased to a specified number, differentiated cells of the cultivation vessel b are detected (S57), and the cultivation vessel b is sterilized and placed on an operation table α (S59). Here, operation information (sterilization operation, placing on the operation table α) is written to the storage section of the cultivation vessel b. Next, differentiated cells are sucked up and removed using a pipette g (S61). The differentiated cells are detected from microscope images. In addition to history information so far, operation information (suction and removal of differentiated cells) is written to the storage section of the pipette g. It should be noted that although removal of differentiated cells has been described, it is also possible to remove non-differentiated cells instead of removing differentiated cells, and add to the history information.

Next a specified amount of stripping solution is suck up from vessel E using pipette h (S63). Contents information (stripping solution), vessel information (vessel E) and operation information (sucking) is written to the storage section of pipette h. The stripping solution of pipette h is then added to cultivation vessel b (S65). Here, in addition to history information so far, information that has been stored in pipette h, additive information (stripping solution), and operation information (addition of the stripping solution) are written to the storage section of cultivation vessel b.

The cultivation vessel b is then placed in the incubator for a specified time (S67), and then the cultivation vessel b is taken out of the incubator (S69). Stripping is advanced by this operation. Here, in addition to the history information so far, operation information (placing in the incubator for a specified time) is written to the storage section of the cultivation vessel b.

Once the cultivation vessel b has been taken out from the incubator, stripping of the cells is inspected (S71). Stripping of the cells is detected from microscope images. A specified amount of PBS is then soaked up from vessel A to the pipette a (S73). Here contents information (PBS), vessel information (vessel A) and operation information (sucking information) is written to the storage section of pipette a. Next, a specified amount of the PBS of pipette a is put into the cultivation vessel b and stirred (S75). Cleansing of cells is performed in this step. In addition to information that has been stored up to now, contents information (PBS), vessel information (pipette a), and operation information (addition and stirring operations) is stored in the storage section of the cultivation vessel b.

Supernatant PBS of the cultivation vessel b is sucked up and removed by the pipette i (S77). In this step a number of cells per unit volume is increased. In addition to information that is been stored up to now operation information is stored in the storage section of cultivation vessel b. iPS cells of the cultivation vessel b are then stripped from the vessel by a stripping fixture j (S79). Here the cells are mechanically scraped off. In addition to information so far, operation information (stripping operation) is written to the storage section of cultivation vessel b.

A given amount of culture medium of the test tube e is sucked up by the pipette j (S81). Here, in addition to history information that has been read out from the test tube e, vessel information (pipette j) and operation information (sucking information) is written to the storage section of the pipette j.

Culture medium is discharged to the cultivation vessel b using the pipette j, and sucked up (S83). Here the cells are dispersed in the culture medium. In addition to history information that has been read out from the pipette j, vessel information (pipette j) and operation information (discharge and sucking) is written to the storage section of the cultivation vessel b.

Culture medium of the cultivation vessel b is then sucked up with the pipette j and put in a test tube k (S85). Here, iPS cells are dispersed in the culture medium. Vessel information and operation information are sequentially cumulatively written to information that has been stored so far, in the storage sections of the pipette j and of the test tube k.

Suspension liquid of the test tube k is then collected with pipette m (S87). Here, in addition to history information that has been read out from the test tube k, contents information (suspension liquid), vessel information (test tube k), and operation information (collecting operation) is written to the storage section of pipette m that has collected the suspension liquid.

Next, suspension liquid of the pipette m is discharged onto a sample table of a cell counter (S89), the number of cells is detected, and it is confirmed whether there is a specified cell density (S91). Here the number of cells is detected from microscope images, cell density is calculated, and it is confirmed whether there is a specified cell density. If a specified cell density is not reached, there is a wait until that specified cell density is reached. Alternatively, suspension liquid may be disposed of.

If a specified cell density is reached, then next a specified amount of the suspension liquid of the test tube k is sucked up by pipette n (S93). Here, history information that has been read out from the test tube k, contents information (suspension liquid), vessel information (test tube k), and operation information (sucking operation) are written to the storage section of pipette n that has sucked up the contents.

Next, suspension liquid is discharged from the pipette n into the cultivation vessel b in which culture medium has been prepared (S95). Here, cell transfer is performed. History information that has been read out from the pipette n, and contents information (suspension liquid), vessel information (pipette n), and operation information (discharge operation), are written to the storage section of the cultivation vessel b into which the contents have been discharged. The culture medium of the cultivation vessel b is then stirred (S97). Here, operation information (stirring operation) is added to the storage section of cultivation vessel b.

Next, cell distribution of the cultivation vessel b is confirmed using a microscope (S99), and if there is no problem cultivation vessel b is placed in the incubator (S101). Here, in addition to the history information so far, operation information (placing in the incubator) is written to the storage section of the cultivation vessel b.

In this way, with the flow for culture medium preparation, if contents are moved, or if an operation is performed even if there is no movement, history information is read from the storage section of the information processing device that is associated with the vessel that has been moved or that is holding the contents that have been operated on. Information such as vessel information and operation information is then written to the history information that has been read out, in the storage section of the information processing device that is associated with the vessel that the contents are moved to or that has been operated. As a result, information is automatically transmitted in response to movement of contents or operation.

Next, an example of cell cultivation will be described using the flowcharts shown in FIG. 14A and FIG. 14B. Here, description will be given of an example of cultivation from frozen cells.

If the flow for cell cultivation is entered, first vessel a (frozen cells vessel) is taken out from a freezing case (S111). Contents information (frozen cells) and vessel information (freezing vessel) are stored in the storage section of the information processing device within vessel a, as history information. Next, the vessel a is set in a thawing tank (S113), and thawed in the thawing tank (S115) in. Since vibration causes the contents will be refrozen, and so care is taken not to apply vibration. Operation information (thawing operation) is added to history information and written to the storage section of the vessel a.

Liquid of the vessel a is then sucked up by pipette b (S117). In addition to history information that has been read out from the storage section of vessel a, vessel information (pipette b) and operation information (sucking operation) is written to the storage section of the pipette b.

Next, the liquid of pipette b is discharged to test tube c (S119). Here, in addition to history information that has been read out from the storage section of pipette b, vessel information (test tube c) and operation information (discharge operation) is written to the storage section of the test tube c.

Culture medium of vessel A is then sucked up by pipette d, and discharged to test tube c (S121). From this step S121 until step S125 removal of cryopreservation agent is performed. Here, in addition to history information that has been read out from the storage section of pipette b, contents information (culture medium) and operation information (discharge operation) is written to the storage section of the test tube c.

Next, the test tube c is placed in a centrifugal separator (S123). Vessel information (centrifugal separator) and operation information (centrifugal separation operation) is written to history information that has been stored in the storage section of the test tube c.

Supernatant liquid of the test tube c is then removed with pipette e (S125). Here, operation information (sucking and removal of supernatant liquid) is written to history information stored in the storage section of the test tube c.

Next, suspension liquid of the test tube c is sucked up by the pipette f (S127). Here, vessel information (pipette f) and operation information (sucking operation) is written to history information that has been read out from the test tube c, in the storage section of the pipette f.

Next, suspension liquid of the pipette f is discharged onto a sample table of a cell counter (S129), the number of cells is detected, and it is confirmed whether there is a specified cell density (S131). Here the number of cells is detected from microscope images, cell density is calculated, it is confirmed whether there is a specified cell density, and if the cell density is not the specified density adjustment is performed so that the specified cell density is achieved.

If a specified cell density is reached, then next a specified amount of the suspension liquid of the test tube c is sucked up by pipette g (S133). Here, history information that has been read out from the test tube c, and contents information (suspension liquid), vessel information (test tube c), and operation information (sucking operation) is written to the storage section of pipette g that has sucked up the contents.

Next, suspension liquid is discharged from the pipette n into the cultivation vessel b in which culture medium has been prepared (S135). Here, cell transfer is performed. History information that has been read out from the pipette n, and contents information (suspension liquid), vessel information (pipette n), and operation information (discharge operation), are written to the storage section of the cultivation vessel b into which the contents have been discharged. The culture medium of the cultivation vessel b is then stirred (S137). Here, operation information (stirring operation) is added to the storage section of cultivation vessel b.

Next, cell distribution of the cultivation vessel b is confirmed using a microscope (S139), and if there is no problem cultivation vessel b is placed in the incubator (S141). Here, in addition to the history information so far, operation information (placing in the incubator) is written to the storage section of the cultivation vessel b.

In this way, in the flow for cell cultivation also, if contents are moved, or if an operation is performed even if there is no movement, history information is read from the storage section of the information processing device that is associated with the vessel that has been moved or that is holding the contents that have been operated on. Information such as vessel information and operation information is then written to the history information that has been read out, in the storage section of the information processing device that is associated with the vessel that the contents are moved to or that has been operated. As a result, information is automatically transmitted in response to movement of contents or operation.

In this way, the information management system of one embodiment of the present invention is a system in which contents (biological material such as cells, bacteria and viruses) are passed between a plurality of vessels, and operations performed on each vessel to generate products. With this system a vessel retains contents information and vessel information, and if vessels approach to within a specified distance of one another at least one of contents information and vessel information is exchanged (refer, for example, to FIG. 1 to FIG. 4).

Figure 13A:
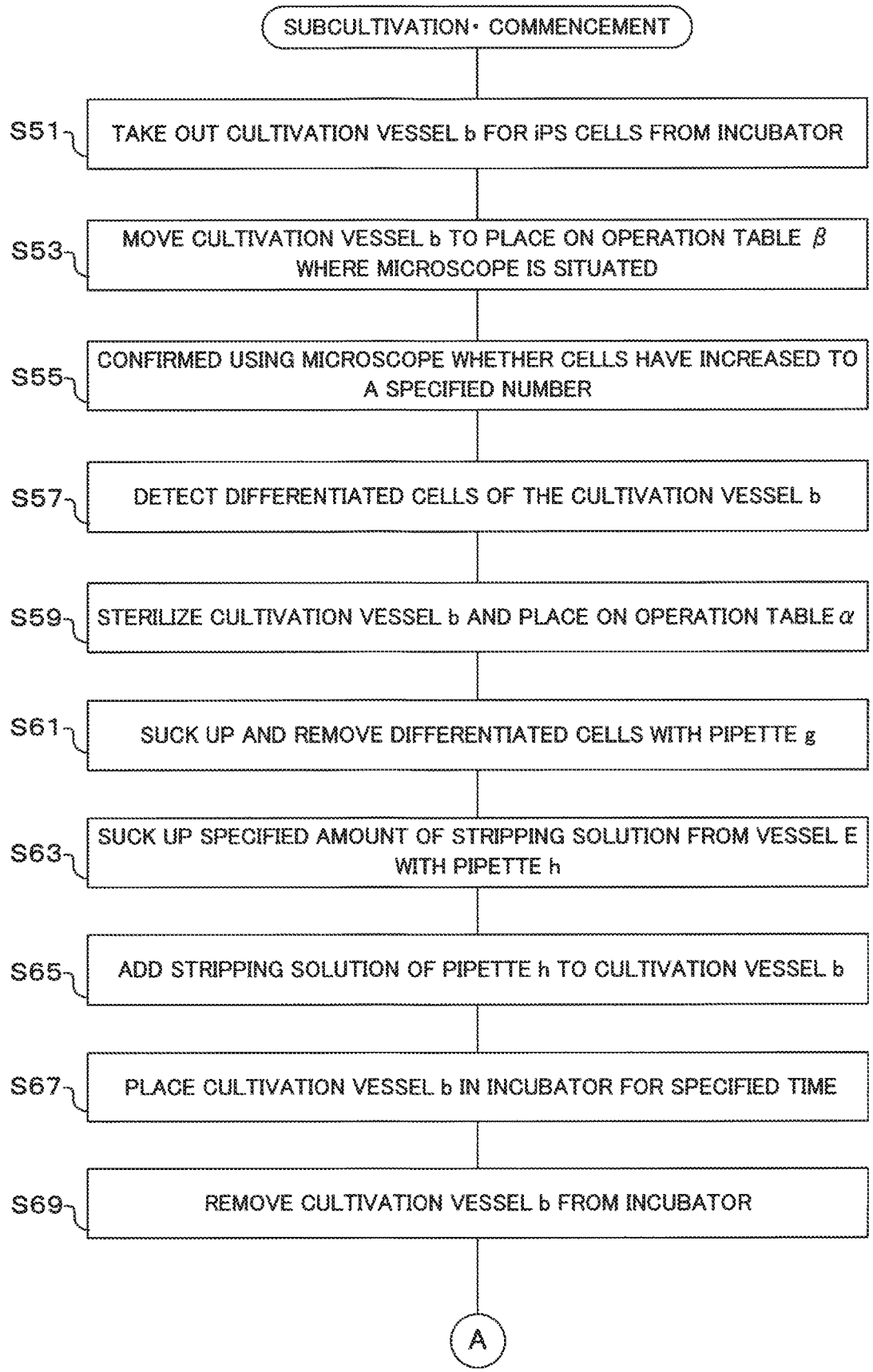
Figure 13C:
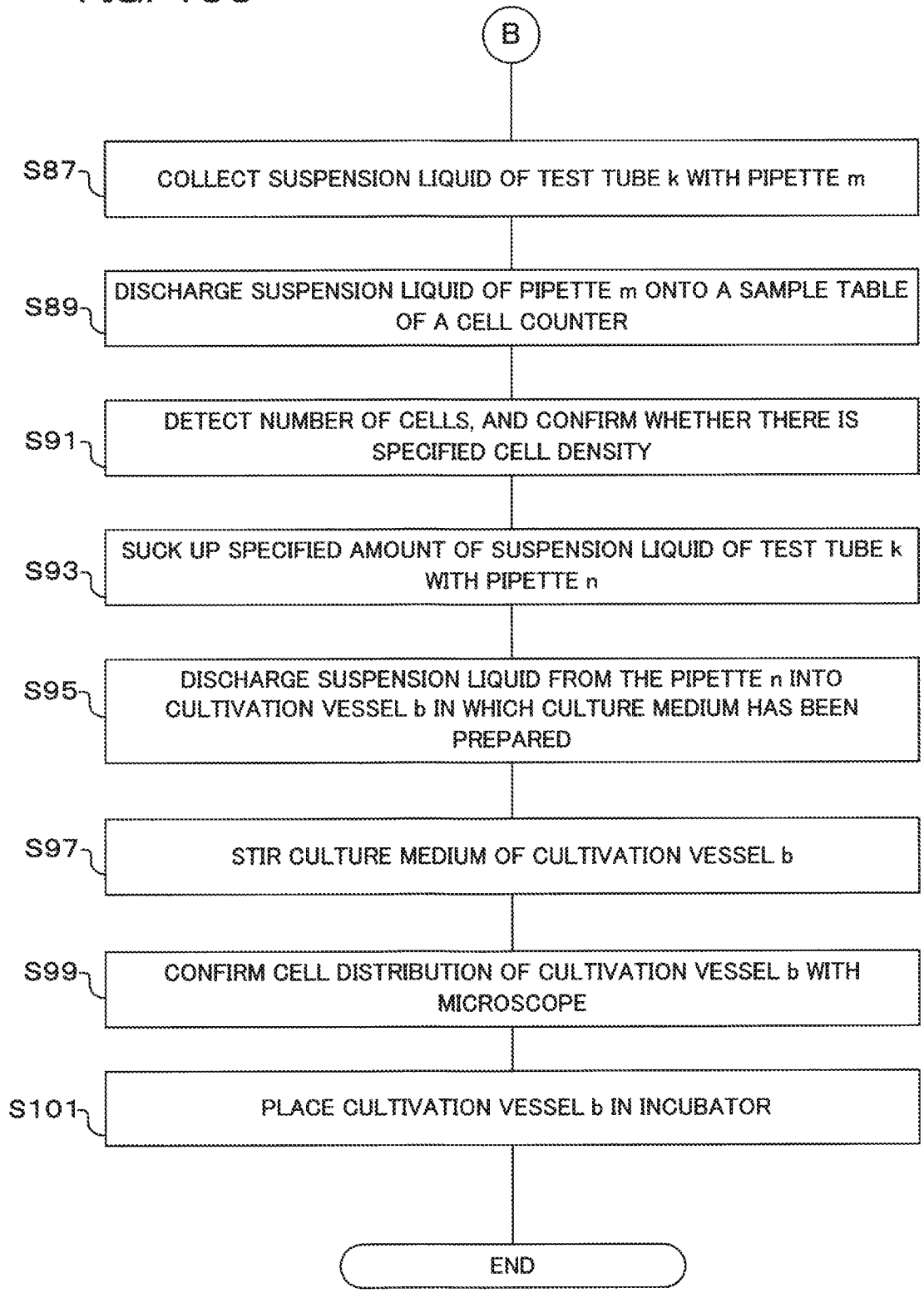

With the information management system of one embodiment of the present invention, when additives that are added to contents are passed between a plurality of vessels, and added to a vessel that contents have been placed into, each vessel has information processing device that retains additive information and vessel information, and when vessels approach to within a specified distance of one another at least one of the additive information and the vessel information is exchanged (refer, for example, to S39 and S41 in FIG. 12, and to S63 and S65 in FIG. 13A).

The information management system of one embodiment of the present invention has an operation detection device (camera, wearable unit) that detects operations of passing contents or additives between vessels, and operation information that has been detected by the operation detecting device is added to an information processing device of the vessel that has received the additives or contents (refer, for example, to FIG. 2, FIG. 7, FIG. 8, and S23, S25, and S27 in FIG. 12). Here operation information is not only for a receiving operation, but may also be for operations performed on contents or additives (stirring or heating) (refer, for example, to S27 and S31 in FIG. 12, and S67 and S69 in FIG. 13A).

Also, the information management system of one embodiment of the present invention has a transmission processing device (refer, for example, to the transmission information processing device Gj461 in FIG. 9) that receives contents information, vessel information and operation information and transmits these items of information to the operator. It should be noted that transition information need not be image information, and may be auditory information and tactile information.

Also, with the information management system of one embodiment of the present invention, approach of a vessel (including a culture vessel and operational fixtures) and operation performed on a vessel are detected, and a control section determines whether a vessel is appropriate, and/or whether an operation is appropriate based on history information from a storage section (cell information, and past vessel information and operation information), and issues a warning in the event that the result of this determination is inappropriate (refer, for example, to the warning section 8 in FIG. 3). If it has been determined that the result of this determination is inappropriate, the contents and vessel etc. may be removed.

In this way, with the information management system of one embodiment of the present invention information is exchanged as a result of a vessel approaching to within a specified distance. This means that contents (biological matter such as cells, bacteria, viruses etc.) information is reliably transmitted every time contents are passed from one vessel to another. Also, additives information on chemical agents etc. that are used by being added to contents is reliably transmitted every time an additive is passed from one vessel to another. Further, operation information (also including operator information) on operations performed on contents is reliably transmitted from vessel to vessel. Further, information on cells, added chemical agents and operations are reliably transmitted to the operator of the contents.

With the one embodiment of the present invention, contents information and additive information etc. is stored in a storage section that has been provided in the vessel (refer, for example, to the storage section 12b in FIG. 4, and device information 305a in FIG. 5, etc.), and if a vessel has approached, these items of information are transmitted. However, this is not limiting, and while making vessels distinguishable, contents information and additive information may be stored together in a server of a processing system or the like, without providing a storage section in a vessel, and if a vessel has approached history information for contents information and additive information etc. may be updated. Also, even if a server or the like is not provided, functions of a server may be dispersed in an information processing device such as an operation table, and history information of contents information and additive information may be updated.

Also, with the one embodiment of the present invention, some or all of functions of each of the communication section 13, each of the sections within the second vessel 12, each of the sections within the communication section 13, the change determination section 202a and the operation signal determination section 202b, etc., may be implemented using a CPU (Central Processing Unit), peripheral circuits and program code, may be implemented by circuits that are executed by program code such as a DSP (Digital Signal Processor), may use a hardware structure such as gate circuits that are generated based on a programming language described using Verilog, or may be executed using hardware circuits.

Also, with the one embodiment and modified example of the present invention, description has been given for an example where cells have been cultivated in a culture medium of a first vessel and second vessel etc., but this is not limiting as long as contents are moved between vessels.

With the one embodiment and modified example of the present invention, portions have been described assuming an example of working with iPS cells, but the present invention is not limited to iPS cells and it is also possible to apply the present invention to working with various cells such as multipotential stem cells, called ES cells, nerves, heart muscle, skin, liver and retina cells that have been differentiated from stem cells, and cells relating to skin, blood, heart muscle, retina, nerves and cartilage etc. that have been collected from organisms. Also, the storage section is not limited to storing operation information in history information, and number of cells, cell density, and information indicating states of cells, known as protein development information, and fluorescence information, may also be added and stored. Also, the present invention is not limited to cultivation by hand, and can also be applied to automatic cultivation devices using machines etc.

Also, among the technology that has been described in this specification, with respect to control that has been described mainly using flowcharts, there are many instances where setting is possible using programs, and such programs may be held in a storage medium or storage section. The manner of storing the programs in the storage medium or storage section may be to store at the time of manufacture, or by using a distributed storage medium, or they be downloaded via the Internet.

Also, with the one embodiment of the present invention, operation of this embodiment was described using flowcharts, but procedures and order may be changed, some steps may be omitted, steps may be added, and further the specific processing content within each step may be altered. It is also possible to suitably combine structural elements from different embodiments.

Also, regarding the operation flow in the patent claims, the specification and the drawings, for the sake of convenience description has been given using words representing sequence, such as "first" and "next", but at places where it is not particularly described, this does not mean that implementation must be in this order.

As understood by those having ordinary skill in the art, as used in this application, 'section,' 'unit,' 'component,' 'element,' 'module,' 'device,' 'member,' 'mechanism,' 'apparatus,' 'machine,' or 'system' may be implemented as circuitry, such as integrated circuits, application specific circuits ("ASICs"), field programmable logic arrays ("FPLAs"), etc., and/or software implemented on a processor, such as a microprocessor.

The present invention is not limited to these embodiments, and structural elements may be modified in actual implementation within the scope of the gist of the embodiments. It is also possible form various inventions by suitably combining the plurality structural elements disclosed in the above described embodiments. For example, it is possible to omit some of the structural elements shown in the embodiments. It is also possible to suitably combine structural elements from different embodiments.

What is claimed is:

1. An information management system, comprising:
a first vessel having a first memory that stores first information;
a second vessel having a second memory that stores second information;
a first detection circuit capable of detecting a proximity signal corresponding to approach of the second vessel to the first vessel;
a second detection circuit that detects an operation signal corresponding to an operation for at least one of the first and second vessels;
a camera installed on an operating space; and
a processor that adds the first information to the second memory that stores the second information, based on the proximity signal detected by the first detection circuit,
wherein the first information and the second information include information on operation content;
wherein the processor adds operation information relating to the operation to the second memory when the operation signal has been detected by the second detection circuit,
wherein the second detection circuit determines an operation content by analyzing an image acquired by the camera, and
wherein the information on the operation content is generated based on a determination by the second detection circuit.

2. The information management system of claim 1, wherein:

the first information and the second information further include at least one of contents information of the first and second vessels, vessel information, and additive information.

3. The information management system of claim 2, wherein:
the vessel information includes information indicating increase and decrease in contents.

4. The information management system of claim 3, wherein:
the increase and decrease in the contents results from an operation performed using a pipette.

5. The information management system of claim 1, further comprising:
an image sensor that images the first and second vessels, wherein the first detection circuit detects the proximity signal based on an image acquired by the image sensor.

6. The information management system of claim 5, wherein:
the image sensor is provided in the camera.

7. The information management system of claim 1, wherein:
the operation information corresponds to an operation of having moved contents of the first vessel to the second vessel.

8. The information management system of claim 7, wherein:
the contents are cells.

9. The information management system of claim 1, wherein:
the processor detects whether or not the first and second vessels are appropriate based on history information that has been created using at least the first information and the second information, and
the information management system further comprises a warning device that issues a warning in response to a determination by the processor that at least one of the first and second vessels is inappropriate.

10. The information management system of claim 1, further comprising:
a communication circuit capable of transmitting and receiving to and from the first memory and the second memory,
wherein when the proximity signal has been detected by the first detection circuit, the processor adds the first information to the second memory that stores the second information via the communication circuit.

11. The information management system of claim 1, wherein the processor reads out first history information stored in the first memory based on at least one of the proximity signal detected by the first detection circuit and the operation signal detected by the second detection circuit, adds the first history information and at least one of information relating to the second vessel and the operation information relating to the operation to the second memory, and rewrites history information that has been stored in the second memory.

12. The information management system of claim 11, further comprising:
a communication circuit capable of transmitting and receiving to and from the first memory and the second memory,
wherein when the at least one of the proximity signal and the operation signal has been detected, the processor adds the first information to the second memory that stores the second information via the communication circuit.

13. The information management system of claim 1, wherein:
the adding of the first information to the second memory is performed directly between the first vessel and the second vessel.

14. The information management system of claim 1, wherein:
the information on the operation content is stored in the second memory with tags attached to the image used in the determination.

15. The information management system of claim 1, wherein:
the information on the operation content is stored in a third memory, the third memory being provided in one of the operating table, a server, a wearable terminal, and a room or building in which operations are performed.

16. An information management method for an information management system that comprises a first vessel having first information, a second vessel having second information, and a camera installed on an operating space, the method comprising:
detecting whether or not the first and second vessels have approached each other;
detecting an operation signal corresponding to an operation for at least one of the first and second vessels, by analyzing an image acquired by the camera;
when it has been detected that the first and second vessels have approached each other, adding the first information to the second information; and
when the operation signal has been detected, adding operation information relating to the operation to the second information,
wherein the first information and the second information include information on operation content, and
wherein the information on the operation content is generated based on the detection of the operation signal.

17. The information management method of claim 16, further comprising:
detecting approach of the first vessel to the operating space at a first time;
detecting approach of the second vessel to the operating space at a second time that is after and continuous with the first time; and
making a period from the second time to a third time that is after and continuous with the second time an enable period in which it is possible to add the first information to the second information.

18. The information management method of claim 17, further comprising:
detecting a specified operation in the enable period.

* * * * *